(12) United States Patent
Brant

(10) Patent No.: US 7,741,420 B2
(45) Date of Patent: Jun. 22, 2010

(54) POLYMER PRODUCTION AT SUPERCRITICAL CONDITIONS

(75) Inventor: Patrick Brant, Seabrook, TX (US)

(73) Assignee: ExxonMobil Chemical Patents Inc., Houston, TX (US)

(*) Notice: Subject to any disclaimer, the term of this patent is extended or adjusted under 35 U.S.C. 154(b) by 698 days.

(21) Appl. No.: 11/629,501

(22) PCT Filed: Jun. 20, 2005

(86) PCT No.: PCT/US2005/021722

§ 371 (c)(1),
(2), (4) Date: Dec. 13, 2006

(87) PCT Pub. No.: WO2006/019494

PCT Pub. Date: Feb. 23, 2006

(65) Prior Publication Data

US 2007/0255018 A1 Nov. 1, 2007

Related U.S. Application Data

(60) Provisional application No. 60/588,156, filed on Jul. 14, 2004.

(51) Int. Cl.
C08F 2/14 (2006.01)
C08F 4/649 (2006.01)
C08F 10/06 (2006.01)

(52) U.S. Cl. .................. 526/206; 526/64; 526/65; 526/90; 526/126; 526/113; 526/114; 526/116; 526/119; 526/127; 526/134; 526/160; 526/161; 526/171; 526/172

(58) Field of Classification Search .............. 526/64, 526/65, 89, 90, 126, 242, 255, 113, 114, 526/119, 127, 134, 160, 161, 171, 172, 116, 526/144, 206

See application file for complete search history.

(56) References Cited

U.S. PATENT DOCUMENTS

| | | | |
|---|---|---|---|
| 2,852,501 A | 9/1958 | Richard et al. | |
| 3,056,771 A | 10/1962 | Aldridge et al. | |
| 3,470,143 A | 9/1969 | Schrage et al. | |
| 4,588,790 A | 5/1986 | Jenkins, III et al. | |
| 5,084,534 A | 1/1992 | Welborn, Jr. et al. | |
| 5,096,867 A | 3/1992 | Canich | |
| 5,326,835 A | 7/1994 | Ahvenainen et al. | |
| 5,352,749 A | 10/1994 | DeChellis et al. | |
| 5,405,922 A | 4/1995 | DeChellis et al. | |
| 5,408,017 A | 4/1995 | Turner et al. | |
| 5,756,608 A | 5/1998 | Langhauser et al. | |
| 5,780,565 A * | 7/1998 | Clough et al. | 526/206 |
| 5,969,062 A | 10/1999 | Moll et al. | |
| 6,084,041 A * | 7/2000 | Andtsjo et al. | 526/64 |
| 6,225,432 B1 | 5/2001 | Weng et al. | |
| 6,355,741 B1 | 3/2002 | Marechal | |
| 6,534,613 B2 * | 3/2003 | Ford et al. | 526/352 |
| 6,562,914 B1 | 5/2003 | Andtsjö et al. | |
| 6,716,942 B1 * | 4/2004 | Saito et al. | 526/242 |
| 6,956,089 B2 * | 10/2005 | Mawson et al. | 526/116 |
| 7,067,450 B2 * | 6/2006 | Zhao et al. | 502/102 |
| 7,319,125 B2 * | 1/2008 | Arjunan et al. | 526/127 |
| 7,354,979 B2 * | 4/2008 | Brant et al. | 526/64 |
| 2001/0044505 A1 | 11/2001 | Ford et al. | |
| 2002/0013440 A1 | 1/2002 | Agarwal et al. | |
| 2004/0054100 A1 * | 3/2004 | Debras et al. | 526/95 |

FOREIGN PATENT DOCUMENTS

| | | |
|---|---|---|
| CA | 2118711 | 3/1993 |
| DE | 4130299 | 3/1993 |
| EP | 0 089 691 | 9/1983 |
| EP | 0 129 368 | 7/1989 |
| EP | 0 459 320 | 8/1995 |
| EP | 1 193 275 | 4/2002 |
| EP | 1 195 391 | 4/2002 |
| EP | 0 957 113 | 11/2002 |
| EP | 1 323 746 | 7/2003 |
| EP | 1 008 607 | 12/2003 |
| EP | 0 887 380 | 2/2004 |
| JP | 1998-045834 A | 2/1998 |
| JP | 1998-110003 A | 4/1998 |
| WO | WO92/14766 | 9/1992 |
| WO | WO93/05082 | 3/1993 |
| WO | WO93/11171 | 6/1993 |
| WO | WO96/12744 | 5/1996 |
| WO | WO96/33227 | 10/1996 |
| WO | WO96/34023 | 10/1996 |
| WO | WO97/11098 | 3/1997 |
| WO | WO97/45434 | 12/1997 |
| WO | WO00/12572 | 3/2000 |
| WO | WO00/37514 | 6/2000 |
| WO | WO01/46273 | 6/2001 |
| WO | WO01/57095 | 8/2001 |
| WO | WO02/50145 | 6/2002 |
| WO | WO02/090399 | 11/2002 |
| WO | WO2005/113610 | 12/2005 |
| WO | WO2005/113615 | 12/2005 |

(Continued)

OTHER PUBLICATIONS

U.S. Appl. No. 11/285,264, filed Nov. 22, 2005, Iaccino et al.
"Olefin Polymerization Using Highly Congested ansa-Metallocenes under High Pressure: Formation of Superhigh Molecular Weight Polyolefins," Suzuki et al., Macromolecules, 2000, 33, 754-759.
"Ethylene Bis(2-indenyl) Zirconocenes, A New Class of Diastereomeric Metallocenes for the (Co)Polymerization of a-Olefins," C. J. Schaverien et al., Organometallics, ACS, Columbus, Ohio, vol. 20, No. 16, Aug. 2001, 3436-3452.

(Continued)

Primary Examiner—Fred M Teskin
(74) Attorney, Agent, or Firm—Catherine L. Bell

(57) ABSTRACT

This invention relates to a process to polymerize olefins comprising contacting, under supercritical conditions, olefin monomers with a catalyst compound, an activator, optional comonomer, and optional hydrocarbon diluent or solvent.

60 Claims, No Drawings

FOREIGN PATENT DOCUMENTS

| | | |
|---|---|---|
| WO | WO2006/002132 | 1/2006 |
| WO | WO2006/009942 | 1/2006 |
| WO | WO2006/009944 | 1/2006 |
| WO | WO2006/009945 | 1/2006 |
| WO | WO2006/009946 | 1/2006 |
| WO | WO2006/009949 | 1/2006 |
| WO | WO2006/009951 | 1/2006 |
| WO | WO2006/009976 | 1/2006 |
| WO | WO2006/009977 | 1/2006 |
| WO | WO2006/009979 | 1/2006 |
| WO | WO2006/009980 | 1/2006 |
| WO | WO2006/009981 | 1/2006 |
| WO | WO2006/019494 | 2/2006 |
| WO | WO2006/025917 | 3/2006 |
| WO | WO2006/028549 | 3/2006 |
| WO | WO2006/083303 | 8/2006 |

OTHER PUBLICATIONS

Abstract from Borealis website: "Metallocene-PP produced under supercritical conditions," Barbo Loefgren, E. Kokko, L. Huhtanen, M Lahelin, Petri Lehmus, Udo Stehling. 1st Bluesky Conference on Catalytic Olefin Polymerization, 17.-20.6.2002, Sorrrento, Italy., (), 2002.

* cited by examiner

US 7,741,420 B2

POLYMER PRODUCTION AT SUPERCRITICAL CONDITIONS

PRIORITY CLAIM

This application is the national phase entry into the United States Patent Office of international application number PCT/US2005/021722 filed Jun. 20, 2005, which claims benefit of and priority to U.S. Provisional Patent Application Ser. No. 60/588,156 filed Jul. 14, 2004.

FIELD OF THE INVENTION

This invention relates to polymerization of olefin monomers under supercritical conditions in the presence of a fluoronated hydrocarbon.

BACKGROUND

Since the mid-1980s metallocene catalysts have been used in high-pressure reactors—mainly for producing ethylene-backbone polymers including ethylene copolymers with monomers of one or more of propylene, butene, and hexene, along with other specialty monomers such as 4-methyl-1,5-hexadiene. For example U.S. Pat. No. 5,756,608, granted to Langhausen et al., reports a process for polymerizing $C_2$ to $C_{10}$ 1-alkenes using bridged metallocene catalysts. Polypropylene production in high pressure conditions has, however, been seen as impractical and unworkable at temperatures much above the propylene critical point. A process to produce commercially useful polypropylene in a high pressure system would provide advantages, such as increased reactivity, or increased catalyst productivity, or higher throughput, or shorter residence times, etc. Likewise new polypropylene polymers are also in constant need for the preparation of new and improved products. Thus there is a need in the art to develop new processes capable of greater efficiency and manufacture of new polypropylene polymers.

In addition there is also a need for polymerization processes that are flexible enough to be used with other monomers. For example a high pressure process to make polyethylene, polybutene or polyhexene is also desirable.

U.S. Pat. No. 6,084,041, granted to Andtsjö et al., discloses supercritical propylene polymerization under relatively mild conditions (90-100° C. and less than 6.89 MPa pressure) using supported Ziegler-Natta and metallocene catalysts. This patent does not relate to propylene copolymerization at temperatures or pressures much higher than described above. It also does not specifically disclose bulk propylene polymerization using soluble, unsupported metallocene catalysts.

U.S. Pat. No. 5,969,062 granted to Mole et al., describes a process for preparing ethylene copolymers with α-olefins in which polymerization is carried out at a pressure between 100-350 MPa and at a temperature from 200-280° C. The catalyst is based on a tetramethylcyclopentadienyl titanium complex.

U.S. Pat. No. 5,408,017 describes an olefin polymerization catalyst for use at polymerization temperatures of 140° C.-160° C., or greater. Mainly, temperatures exceeding the melting point temperature and approaching the polymer decomposition temperature are said to yield high productivity.

WO 93/11171 discloses a polyolefin production process that comprises continuously feeding olefin monomer and a metallocene catalyst system into a reactor. The monomer is continuously polymerized to provide a monomer-polymer mixture. Reaction conditions keep this mixture at a pressure below the system's cloud-point pressure. These conditions create a polymer-rich and a monomer-rich phase and maintain the mixture's temperature above the polymer's melting point.

U.S. Pat. No. 6,355,741 discloses a process for producing polyolefins having a bimodal molecular weight distribution. The process comprises producing a first polyolefin fraction in a first loop reactor. The process couples this first loop reactor to a second loop reactor that prepares a second polyolefin fraction. At least one of the loops uses supercritical conditions.

WO 92/14766 describes a process comprising the steps of (a) continuously feeding olefinic monomer and a catalyst system, with a metallocene component and a cocatalyst component, to the reactor; (b) continuously polymerizing that monomer in a polymerization zone reactor under elevated pressure; (c) continuously removing the polymer/monomer mixture from the reactor; (d) continuously separating monomer from molten polymer; (e) reducing pressure to form a monomer-rich and a polymer-rich phase; and (f) separating monomer from the reactor.

U.S. Pat. No. 5,326,835 describes bimodal polyethylene production. The first reactor stage is a loop reactor in which polymerization occurs in an inert, low-boiling hydrocarbon. After the loop reactor, the reaction medium transits into a gas-phase reactor where gas-phase ethylene polymerization occurs. The polymer produced appears to have a bimodal molecular weight distribution.

CA 2,118,711 (equivalent to DE 4,130,299) describes propylene polymerization at 149° C. and 1510 bar using $(CH_3)_2$C(fluorenyl)(cyclopentadienyl)zirconium dichloride complex, methylalumoxane and trimethylaluminum. Catalyst activity is reported to be 8380 gPP/g Ic'h. The $M_w$ is reported to be 2,000. CA 2,118,711 also describes propylene polymerization with ethylene at 190° C. and 1508 bar using $(CH_3)_2$C (fluorenyl)(cyclopentadienyl)zirconium dichloride complex, methylalumoxane and trimethylaluminum. Catalyst activity is reported to be 24358 g Polymer/gIc' hr. The $M_w$ is reported to be 10,000.

EP 1 323 746 shows loading of biscyclopentadienyl catalyst onto a silica support in perfluorooctane and thereafter the prepolymerization of ethylene at room temperature.

U.S. Pat. No. 3,056,771 discloses polymerization of ethylene using $TiCl_4/(Et)_3Al$ in a mixture of heptane and perfluoromethylcyclohexane, presumably at room temperature.

Other references of interest include:

*Olefin Polymerization Using Highly Congested ansa-Metallocenes under High Pressure: Formation of Superhigh Molecular Weight Polyolefins*, Suzuki, et al., Macromolecules, 2000, 33, 754-759, EP 1 123 226, WO 00 12572, WO 00 37514, EP 1 195 391, U.S. Pat. No. 6,355,741, and *Ethylene Bis(Indenyl) Zirconocenes . . .* , Schaverien, C. J. et al., Organometallics, ACS, Columbus Ohio, vol 20, no. 16, August 2001, pg 3436-3452, WO 96/34023, WO 97/11098, U.S. Pat. Nos. 5,084,534, 2,852,501, WO 93/05082, EP 129 368 B1, WO 97/45434, JP 96-208535 199660807, U.S. Pat. No. 5,096,867, WO 96/12744, U.S. Pat. Nos. 5,408,017, 5,084,534, 6,225,432, WO 02/090399, EP 1 195 391, WO 02/50145, US 2002 013440, WO 01/46273, EP 1 008 607, JP-1998-110003A, U.S. Pat. No. 6,562,914, and JP-1998-341202B2.

Another item of interest is an abstract obtained from the Borealis website that states:

Barbo Loefgren, E. Kokko, L. Huhtanen, M Lahelin, Petri Lehmus, Udo Stehling. "Metallocene-PP produced under supercritical conditions." 1*st Bluesky Conference* on *Catalytic Olefin Polymerization*, 17.-20.6.2002, Sorrento, Italy., ( ), 2002. "mPP produced in bulk conditions (100% propylene), especially at elevated temperature and under supercritical conditions, shows rheological behaviour indicative for small amounts of LCB in the polymer. This is a feature that can be utilized to produce mPP with enhanced melt strength under industrially meaningful conditions."

SUMMARY

This invention relates to a process to polymerize olefins comprising contacting, under supercritical conditions, olefin monomers with a catalyst compound, an activator, optional comonomer, and optional hydrocarbon diluent or solvent.

Definitions

For purposes of this invention and the claims thereto:

A catalyst system is defined to be the combination of a catalyst compound and an activator.

The cloud point pressure is the pressure below which, at a given temperature, the polymerization system becomes turbid as described in J. Vladimir Oliveira, C. Dariva and J. C. Pinto, Ind. Eng, Chem. Res. 29, 2000, 4627. For purposes of this invention and the claims thereto, the cloud point is measured by shining a helium laser through the selected polymerization system in a cloud point cell onto a photocell and recording the pressure at the onset of light scattering for a given temperature.

The cloud point temperature is the temperature below which, at a given pressure, the polymerization system becomes turbid as described in J. Vladimir Oliveira, C. Dariva and J. C. Pinto, Ind. Eng, Chem. Res. 29, 2000, 4627. For purposes of this invention and the claims thereto, the cloud point is measured by shining a helium laser through the selected polymerization system in a cloud point cell onto a photocell and recording the temperature at the onset of light scattering for a given pressure.

A higher α-olefin is defined to be an olefin having 4 or more carbon atoms.

Use of the term "polymerization" encompasses any polymerization reaction such as homopolymerization and copolymerization.

A copolymerization encompasses any polymerization reaction of two or more monomers.

The new numbering scheme for the Periodic Table Groups is used as published in CHEMICAL AND ENGINEERING NEWS, 63(5), 27 (1985).

When a polymer is referred to as comprising an olefin, the olefin present in the polymer is the polymerized form of the olefin.

An oligomer is defined to be compositions having 2-75 mer units.

A polymer is defined to be compositions having 76 or more mer units.

The following abbreviations are used: Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, TMS is trimethylsilyl, TIBA is trisobutylaluminum, MAO is methylalumoxane, pMe is para-methyl, flu is fluorenyl, cp is cyclopentadienyl.

As used herein, the term "slurry polymerization" means a polymerization process that involves at least two phases, e.g., in which particulate, solid polymer (e.g., granular) is formed in a liquid, supercritical, or vapor polymerization medium, or in a liquid/vapor polymerization medium.

As used herein, the term "bulk polymerization" means a polymerization process in which the polymerization medium is predominantly monomer and contains less than 50 wt % of solvent or diluent.

DETAILED DESCRIPTION

This invention relates to a process to polymerize olefins, particularly ethylene and or propylene, in the presence of a hydrofluorocarbon under supercritical conditions.

By supercritical conditions is meant that the combination of the monomers, comonomers, fluorocarbon, solvent, diluent and polymer product is not turbid at the polymerization pressure and temperature. Turbidity is present when light scattering is observed when shining a helium laser through the combination in a cloud point cell onto a photocell.

The processes of this invention occur in a supercritical polymerization medium, preferably above the cloud point of the medium. A supercritical state exists for a substance when the substance's temperature and pressure are above its critical point. When the pressure or temperature exceeds the critical state, the fluid is in its supercritical state. The critical pressure and critical temperature of a fluid may be altered by combining it with another fluid, such as a diluent or anther monomer. Thus, for the purposes of this invention and the claims thereto a supercritical polymerization medium is the state where the polymerization medium is present at a temperature above the critical temperature and critical pressure of the medium.

For purposes of this invention and the claims thereto, the critical temperatures (Tc) and critical pressures (Pc) are found in the Handbook of Chemistry and Physics, David R. Lide, Editor-in-Chief, 82nd edition 2001-2002, CRC Press, LLC. New York, 2001. In particular the Tc and Pc of various molecules are defined to be:

| Name | Tc (° K) | Pc (MPa) | Name | Tc (° K) | Pc (MPa) |
|---|---|---|---|---|---|
| Hexane | 507.6 | 3.025 | Propane | 369.8 | 4.248 |
| Isobutane | 407.8 | 3.640 | Toluene | 591.8 | 4.11 |
| Ethane | 305.3 | 4.872 | Methane | 190.56 | 4.599 |
| Cyclobutane | 460.0 | 4.98 | Butane | 425.12 | 3.796 |
| Cyclopentane | 511.7 | 4.51 | Ethylene | 282.34 | 5.041 |
| 1-butene | 419.5 | 4.02 | Propylene | 364.9 | 4.60 |
| 1-pentene | 464.8 | 3.56 | Cyclopentene | 506.5 | 4.80 |
| Pentane | 469.7 | 3.370 | Isopentane | 460.4 | 3.38 |
| Benzene | 562.05 | 4.895 | Cyclohexane | 553.8 | 4.08 |
| 1-hexene | 504.0 | 3.21 | Heptane | 540.2 | 2.74 |

273.2 K = 0° C.

In some embodiments, optional comonomer, diluents or other fluids are present in the polymerization medium along with the monomer and flourinated hydrocarbon. Diluents, comonomers and other fluids each modify the media's critical point; and hence, alter the pressure-temperature regime within which a particular medium is in a supercritical state. Diluents, comonomers and other fluids each also modify the phase behavior of the polymerization medium; and hence, alter the pressure-temperature regime within which a particular medium is single phased. Consequently, a two component reaction medium can have two phases above its critical point.

While this disclosure speaks of two phases for neat propylene with dissolved polypropylene converting to a single phase above the reaction mixture's cloud point, the reality is that the phase behavior is more complicated, especially when the reaction medium is more complicated than neat propylene. This added complication can show up anytime the reaction medium contains an additional component, such as a diluent.

The terms "two-phase polymerization system" or "two-phase polymerization medium" mean a system having two and, preferably, only two phases. In certain embodiments, the two phases are referenced as a "first phase" and a "second phase." In certain embodiments, the first phase is or includes a "monomer phase," which includes monomers, fluorinated hydrocarbon and may also include hydrocarbon solvent and some or all of the product of polymerization. Preferably, however, the monomer phase does not include the polymer product. That is, for example in a propylene polymerization, the monomer phase can be referred to as the "propylene phase." In certain embodiments, the second phase is or includes a solid phase, which may include products of polymerization, e.g., macromers and polymer product, but not monomers, e.g., propylene. None of the parts of the catalyst system are considered to be part of the polymerization system, although certain parts of the catalyst system can obviously be solid, e.g., supported catalysts. Furthermore, it is contemplated that parts of the catalyst system may be liquid or vapor or part of the vapor/liquid phase that exists in certain embodiments of the process.

Some embodiments of the present invention select the temperature and pressure so that the polymer produced in the reaction and the reaction medium that solvates it remain single phased, i.e. above the reaction medium's cloud point with that polymer. Other embodiments select the temperature and pressure so that the reaction medium remains supercritical, but at a pressure below the polymer's cloud point in the particular reaction medium. This results in a two phase reaction medium: a polymer rich phase and a polymer lean phase. Some embodiments that are below the polymer's cloud point nonetheless operate above the polymer's crystallization temperature.

Fluorocarbons

The polymerization processes of this invention are preferably conducted in the presence of a perfluorocarbon ("PFC" or "PFC's") or a hydrofluorocarbon ("HFC" or "HFC's"), collectively referred to as "fluorinated hydrocarbons" or "fluorocarbons" ("FC" or "FC's").

Fluorocarbons are defined to be compounds consisting essentially of at least one carbon atom and at least one fluorine atom, and optionally hydrogen atom(s). A perfluorocarbon is a compound consisting essentially of carbon atom and fluorine atom, and includes for example linear branched or cyclic, $C_1$ to $C_{40}$ perfluoroalkanes. A hydrofluorocarbon is a compound consisting essentially of carbon, fluorine and hydrogen. Preferred FC's include those represented by the formula: $C_xH_yF_z$ wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most preferably from 1 to 3, wherein y is greater than or equal 0 and z is an integer and at least one, more preferably, y and z are integers and at least one. Preferred perfluorocarbons include those where y is zero and x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most preferably from 1 to 3. In a preferred embodiment, z is 2 or more. For purposes of this invention and the claims thereto, the terms hydrofluorocarbon and fluorocarbon do not include chlorofluorocarbons.

In one embodiment, a mixture of fluorocarbons are used in the process of the invention, preferably a mixture of a perfluorinated hydrocarbon and a hydrofluorocarbon, and more preferably a mixture of a hydrofluorocarbons. In yet another embodiment, the hydrofluorocarbon is balanced or unbalanced in the number of fluorine atoms in the HFC used.

Non-limiting examples of fluorocarbons useful in this invention include fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,2,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane; 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4-nonafluorobutane; 1,1,1,2,2,3,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane. Particularly preferred fluorocarbons include difluoromethane, trifluoromethane, 1,1-difluoroethane, 1,1,1-trifluoroethane, fluoromethane, and 1,1,1,2-tetrafluoroethane. In addition to those fluorocarbons described herein, those fluorocarbons described in Raymond Will, et. al., CEH Marketing Report, Fluorocarbons, Pages 1-133, by the Chemical Economics Handbook-SRI International, April 2001, which is fully incorporated herein by reference, are included.

In another preferred embodiment, the fluorocarbon(s) used in the process of the invention are selected from the group consisting of difluoromethane, trifluoromethane, 1,1-difluoroethane, 1,1,1-trifluoroethane, and 1,1,1,2-tetrafluoroethane and mixtures thereof.

In one particularly preferred embodiment, the commercially available fluorocarbons useful in the process of the invention include HFC-236fa having the chemical name 1,1,1,3,3,3-hexafluoropropane, HFC-134a having the chemical name 1,1,1,2-tetrafluoroethane, HFC-245fa having the chemical name 1,1,1,3,3-pentafluoropropane, HFC-365mfc having the chemical name 1,1,1,3,3-pentafluorobutane, R-318 having the chemical name octafluorocyclobutane, and HFC-43-10mee having the chemical name 2,3-dihydrodecafluoropentane.

In another embodiment, the fluorocarbon is not a perfluorinated C4 to C10 alkane. In another embodiment, the fluorocarbon is not a perfluorinated hydrocarbon. In another embodiment, the fluorocarbon is not perfluorodecalin, perfluoroheptane, perfluorohexane, perfluoromethylcyclohexane, perfluorooctane, perfluoro-1,3-dimethylcyclohexane, perfluorononane, fluorobenzene, or perfluorotoluene. In a particularly preferred embodiment, the fluorocarbon consists essentially of hydrofluorocarbons.

In another embodiment the fluorocarbon is present at more than 1 weight %, based upon the weight of the fluorocarbon and any hydrocarbon solvent/diluent present in the reactor, preferably greater than 3 weight %, preferably greater than 5 weight %, preferably greater than 7 weight %, preferably greater than 10 weight %, preferably greater than 15 weight %, preferably greater than 20 weight %, preferably greater than 25 weight %, preferably greater than 30 weight %, preferably greater than 35 weight %, preferably greater than 40 weight %, preferably greater than 50 weight %, preferably greater than 55 weight %, preferably greater than 60 weight %, preferably greater than 70 weight %, preferably greater than 80 weight %, preferably greater than 90 weight %. In another embodiment the fluorocarbon is present at more than 1 weight %, based upon the weight of the fluorocarbons, monomers and any hydrocarbon solvent present in the reactor, preferably greater than 3 weight %, preferably greater than 5 weight %, preferably greater than 7 weight %, preferably greater than 10 weight %, preferably greater than 15 weight %, preferably greater than 20 weight %, preferably greater than 25 weight %, preferably greater than 30 weight %, preferably greater than 35 weight %, preferably greater than 40 weight %, preferably greater than 50 weight %, preferably greater than 55 weight %, preferably greater than 60 weight %, preferably greater than 70 weight %, preferably greater than 80 weight %, preferably greater than 90 weight %. In the event that the weight basis is not named for the weight % fluorocarbon, it shall be presumed to be based upon the total weight of the fluorocarbons, monomers and hydrocarbon solvents present in the reactor.

In another embodiment the fluorocarbon, preferably the hydrofluorocarbon, is present at more than 1 volume %, based upon the total volume of the fluorocarbon and any hydrocarbon solvent present in the reactor, preferably greater than 3 volume %, preferably greater than 5 volume %, preferably greater than 7 volume %, preferably greater than 10 volume %, preferably greater than 15 volume %, preferably greater than 20 volume %, preferably greater than 25 volume %, preferably greater than 30 volume %, preferably greater than 35 volume %, preferably greater than 40 volume %, preferably greater than 45 volume %, preferably greater than 50 volume %, preferably greater than 55 volume %, preferably greater than 60 volume %, preferably greater than 65 volume %.

In another embodiment the fluorocarbon is a blend of hydrofluorocarbon and perfluorocarbon and preferably the hydrofluorocarbon is present at more than 1 volume %, based upon the total volume of the perfluorocarbon and the hydrofluorocarbon present in the reactor, (with the balance being made up by the perfluorocarbon) preferably greater than 3 volume %, preferably greater than 5 volume %, preferably greater than 7 volume %, preferably greater than 10 volume %, preferably greater than 15 volume %, preferably greater than 20 volume %, preferably greater than 25 volume %, preferably greater than 30 volume %, preferably greater than 35 volume %, preferably greater than 40 volume %, preferably greater than 45 volume %, preferably greater than 50 volume %, preferably greater than 55 volume %, preferably greater than 60 volume %, preferably greater than 65 volume %.

In yet another embodiment, the fluorocarbons of the invention have a weight average molecular weight (Mw) greater than 30 a.m.u., preferably greater than 35 a.m.u, and more preferably greater than 40 a.m.u. In another embodiment, the fluorocarbons of the invention have a Mw greater than 60 a.m.u, preferably greater than 65 a.m.u, even more preferably greater than 70 a.m.u, and most preferably greater than 80 a.m.u. In still another embodiment, the fluorocarbons of the invention have a Mw greater than 90 a.m.u, preferably greater than 100 a.m.u, even more preferably greater than 135 a.m.u, and most preferably greater than 150 a.m.u. In another embodiment, the fluorocarbons of the invention have a Mw greater than 140 a.m.u, preferably greater than 150 a.m.u, more preferably greater than 180 a.m.u, even more preferably greater than 200 a.m.u, and most preferably greater than 225 a.m.u. In an embodiment, the fluorocarbons of the invention have a Mw in the range of from 90 a.m.u to 1000 a.m.u, preferably in the range of from 100 a.m.u to 500 a.m.u, more preferably in the range of from 100 a.m.u to 300 a.m.u, and most preferably in the range of from about 100 a.m.u to about 250 a.m.u.

In yet another embodiment, the fluorocarbons of the invention have normal boiling point in the range of from about $-100°$ C. up to the polymerization temperature, preferably up to about $70°$ C., preferably up to about 85 to $115°$ C., preferably the normal boiling point of the fluorocarbons is in the range of from $-80°$ C. to about $90°$ C., more preferably from about $-60°$ C. to about $85°$ C., and most preferably from about $-50°$ C. to about $80°$ C. In an embodiment, the fluorocarbons of the invention have normal boiling point greater than $-50°$ C., preferably greater than $-50°$ C. to less than $-10°$ C. In a further embodiment, the fluorocarbons of the invention have normal boiling point greater than $-5°$ C., preferably greater than $-5°$ C. to less than $-20°$ C. In one embodiment, the fluorocarbons of the invention have normal boiling point greater than 10° C., preferably greater than 10° C. to about 60° C.

In another embodiment, the fluorocarbons of the invention have a liquid density @ 20° C. (g/cc)less than 2 g/cc, preferably less than 1.6, preferably less than 1.5 g/cc, preferably less than 1.45 g/cc, preferably less than 1.40, and most preferably less than 1.20 g/cc.

In one embodiment, the fluorocarbons of the invention have a $\Delta$H Vaporization at the normal boiling point as measured by standard calorimetry techniques in the range between 100 kJ/kg to less than 500 kJ/kg, preferably in the range of from 110 kJ/kg to less than 450 kJ/kg, and most preferably in the range of from 120 kJ/kg to less than 400 kJ/kg.

In another preferred embodiment, the fluorocarbons of the invention have any combination of two or more of the aforementioned Mw, normal boiling point, $\Delta$H Vaporization, and liquid density values and ranges. In a preferred embodiment, the fluorocarbons useful in the process of the invention have a Mw greater than 30 a.m.u, preferably greater than 40 a.m.u, and a liquid density less than 2.00 g/cc, preferably less than 1.8 g/cc. In yet another preferred embodiment, the fluorocarbons useful in the process of the invention have a liquid density less than 1.9 g/cc, preferably less than 1.8 g/cc, and a normal boiling point greater than –100° C., preferably greater than –50° C. up to the polymerization temperature of the process, (such as up to 115° C.), preferably less than 100° C., and more preferably less than 90° C., and most preferably less than 60° C., and optionally a $\Delta$H Vaporization in the range from 120 kj/kg to 400 kj/kg.

In another embodiment the fluorocarbons are used in combination with one or more hydrocarbon solvents. Preferably, the hydrocarbon solvent is an aliphatic or aromatic hydrocarbon fluids. Examples of suitable, preferably inert, solvents include, for example, saturated hydrocarbons containing from 1 to 10, preferably 3 to 8 carbon atoms, such as propane, n-butane, isobutane, n-pentane, isopentane, neopentane, n-hexane, isohexane, cyclohexane and other saturated $C_6$ to $C_8$ hydrocarbons. Preferred hydrocarbon fluids also include desulphurized light virgin naphtha and alkanes (preferably C1 to C8 alkanes), such as propane, isobutane, mixed butanes, hexane, pentane, isopentane, octane, isooctane, cyclohexane and octane. Likewise one may also use mixtures of C3 to C20 paraffins and isoparaffins, preferably paraffinic/ isoparrifinic mixtures of C4, C5 and or C6 alkanes.

In another embodiment, the fluorocarbon fluid is selected based upon its solubility or lack thereof in a particular polymer being produced. Preferred fluorocarbons have little to no solubility in the polymer. Solubility in the polymer is measured by forming the polymer into a film of thickness between 50 and 100 microns, then soaking it in fluorocarbon (enough to cover the film) for 4 hours at the relevant desired polymerization temperature in a sealed container or vessel. The film is removed from the fluorocarbon, exposed for 90 seconds to evaporate excess fluorocarbon from the surface of the film, and weighed. The mass uptake is defined as the percentage increase in the film weight after soaking. The fluorocarbon or fluorocarbon mixture is selected so that the polymer has a mass uptake of less than 4 wt %, preferably less than 3 wt %, more preferably less than 2 wt %, even more preferably less than 1 wt %, and most preferably less than 0.5 wt %.

In a preferred embodiment, the fluorocarbon(s) or mixtures thereof, preferably, the HFC's or mixtures thereof, are selected such that the polymer melting temperature Tm is reduced (or depressed) by not more than 15° C. by the presence of the fluorocarbon. The depression of the polymer melting temperature $\Delta$Tm is determined by first measuring the melting temperature of a polymer by differential scanning calorimetry (DSC), and then comparing this to a similar measurement on a sample of the same polymer that has been soaked with the fluorocarbon for four hours. In general, the melting temperature of the soaked polymer will be lower than that of the dry polymer. The difference in these measurements is taken as the melting point depression $\Delta$Tm. Higher concentrations of dissolved materials in the polymer cause larger depressions in the polymer melting temperature (i.e. higher values of $\Delta$Tm). A suitable DSC technique for determining the melting point depression is described by, P. V. Hemmingsen, "Phase Equilibria in Polyethylene Systems", Ph.D Thesis, Norwegian University of Science and Technology, March 2000, which is incorporated herein by reference. (A preferred set of conditions for conducting the tests are summarized on Page 112 of this reference.) The polymer melting temperature is first measured with dry polymer, and then repeated with the polymer immersed in liquid (the fluorocarbon to be evaluated). As described in the reference above, it is important to ensure that the second part of the test, conducted in the presence of the liquid, is done in a sealed container so that the liquid is not flashed during the test, which could introduce experimental error. In one embodiment, the $\Delta$Tm is less than 12° C., preferably less than 10° C., preferably less than 8° C., more preferably less than 6° C., and most preferably less than 4° C. In another embodiment, the measured $\Delta$Tm is less than 5° C., preferably less than 4° C., more preferably less than 3° C., even more preferably less than 2° C., and most preferably less than 1° C.

In a preferred embodiment, the fluorocarbon(s) or mixtures thereof, preferably, the fluorocarbon or mixtures thereof, are selected such that these are miscible to the hydrocarbon solvent and liquid monomers when a mixture is used. By miscible is meant that the FC and the hydrocarbon mixture will not have liquid phase separation. Liquid phase separation is determined by mixing a fluorocarbon and a hydrocarbon in a vessel with sight glass at polymerization conditions, then visually observing if phase separation occurs after vigorous mixing for five minutes.

In another embodiment the fluorocarbon is present at more than 5 weight %, based upon the weight of the fluorocarbon and any hydrocarbon solvent present in the reactor, preferably greater than 7 weight %, preferably greater than 10 weight %, preferably greater than 15 weight %.

In a preferred embodiment, the temperature of the polymerization is above 95° C., preferably above 100° C., preferably above 110° C., preferably above 120° C., preferably above 130° C., preferably above 140° C., preferably above 150° C., preferably above 160° C., preferably above 170° C., preferably above 180° C., preferably above 19° C., preferably above 200° C., preferably above 210° C., preferably above 220° C., preferably above 230° C., preferably above 240° C., preferably above 250° C. In another embodiment, the polymerization temperature is between 95° C. and 350° C., preferably between 100° C. and 250° C., preferably between 120° C. and 200° C.

In another embodiment the pressure of the polymerization is 5 MPa or greater, preferably 7 MPa or greater, preferably 10 MPa or greater, preferably 15 MPa or greater, preferably 20 MPa or greater, preferably 30 MPa or greater, preferably 40 MPa or greater, preferably 50 MPa or greater, preferably 60 MPa or greater, preferably 70 MPa or greater, preferably 80 MPa or greater, preferably 90 MPa or greater, preferably 100 MPa or greater, preferably 125 MPa or greater, preferably 150 MPa or greater, preferably 180 MPa or greater. In another embodiment, the pressure of the polymerization is between 5 and 300 MPa, preferably between 7 and 250 MPa, preferably between 10 and 200 MPa, preferably between 20 and 150 MPa.

In a preferred embodiment, ethylene is the olefin and is present at least 50 weight % (based upon the weight of the monomers and comonomers) and the pressure is between 5 and 200 MPa and the temperature is between 95 and 220° C., preferably the pressure is between 10 and 150 MPa and the temperature is between 120 and 200° C., preferably the pressure is between 20 and 120 MPa and the temperature is between 130 and 190° C., more preferably the pressure is between 40 and 100 MPa and the temperature is between 135 and 170° C.

In a preferred embodiment, propylene is the olefin and is present at least 50 weight % (based upon the weight of the monomers and comonomers) and the pressure is between 20 and 250 MPa and the temperature is between 100 and 200° C., preferably the pressure is between 40 and 150 MPa and the temperature is between 120 and 170° C., preferably the pressure is between 50 and 100 MPa and the temperature is between 125 and 160° C., more preferably the pressure is between 60 and 90 MPa and the temperature is between 130 and 150° C.

In a particularly preferred embodiment, this invention relates to a process to polymerize olefins comprising contacting, in a polymerization system, olefin monomers having three or more carbon atoms, at a temperature above the cloud point temperature of the polymerization system and a pressure no lower than 10 MPa below the cloud point pressure of the polymerization system and less than 150 MPa, where the polymerization system is defined to be the monomers, any comonomer present, fluorinated hydrocarbon, any hydrocarbon diluent or solvent present, the polymer product, where the fluorinated hydrocarbon is present at least 1 weight %, based upon the weight of the polymerization system, and preferably where the olefin monomer is present at 40 weight % or more, based upon the weight of the polymerization system, Preferably the olefin monomer is propylene.

In another embodiment, this invention relates to a process to polymerize olefins comprising contacting, in a polymerization system, olefin monomers having three or more carbon atoms with a metallocene catalyst compound, a bisamide catalyst compound or a bisimide catalyst compound, an activator, optionally comonomer, and optionally diluent or solvent, at a temperature above the cloud point temperature of the polymerization system and a pressure no lower than 10 MPa below the cloud point pressure of the polymerization system and less than 150 MPa, where the polymerization system comprises the monomers, any comonomer present, at lest 1 weight % fluorinated hydrocarbon, any hydrocarbon diluent or solvent present, the polymer product, and where the olefin monomers are present in the polymerization system at 40 weight % or more.

For purposes of this invention and the claims thereto polymerization system is defined to be monomer(s) plus comonomer(s) plus fluorinated hydrocarbon(s), plus hydrocarbon solvent(s)/diluent(s) plus polymer product present.

In a preferred embodiment, the polymerization system comprises less than 20 wt % aromatic hydrocarbons. Preferably less than 20 wt % toluene.

In a preferred embodiment, the temperature of the polymerization system is 3° C. or more above the cloud point temperature for the polymerization system, alternately 5° C. or more, alternately 10° C. or more, alternately 15° C. or more, alternately 20° C. or more, alternately 25° C. or more, alternately 30° C. or more. Even more preferably the temperature is between 140 and 220° C., preferably 145 and 200° C., preferably 150 and 190° C., preferably 150 to 180° C., preferably 140 to 170° C.

In another preferred embodiment, the pressure of the polymerization system is no lower than 10 MPa below the cloud point pressure of the polymerization system, preferably no lower than 5 MPa below the cloud point pressure, preferably above the cloud point pressure, preferably 5 MPa or more above the cloud point pressure, preferably 50 MPa or more, preferably 100 MPa. Preferably the pressure is 5 MPa or more, preferably 10MPa or more, more preferably up to 350 MPa. Even more preferably the pressure is between 15 and 200 MPa, preferably 20 and 150 MPa, preferably 25 and 100 MPa, preferably 30 and 75 MPa, most preferably between 25 and 50 MPa.

Preferably hydrocarbon solvent and or diluent is present in the polymerization system at 0 to 50 wt %, preferably 0 to 25 wt %, preferably 0 to 20, preferably 0 to 15 preferably 0 to 10 preferably 0 to 5, preferably, 0 to 4, preferably 0 to 3, preferably 0 to 2, preferably 0 to 1 wt %.

In a preferred embodiment the olefin monomers are present in the polymerization system at 45 wt % or more, preferably 50 wt % or more, preferably at 55 wt % or more, preferably 60 wt % or more, preferably at 65 wt % or more, preferably 70 wt % or more, preferably at 75 wt % or more, preferably 80 wt % or more, preferably at 85 wt % or more.

In a preferred embodiment propylene is present in the polymerization system at 45 wt % or more, preferably 50 wt % or more, preferably at 55 wt % or more, preferably 60 wt % or more, preferably at 65 wt % or more, preferably 70 wt % or more, preferably at 75 wt % or more, preferably 80 wt % or more, preferably at 85 wt % or more. In a preferred embodiment propylene and up to 30 mol % of one or more comonomers are present in the polymerization system at 45 wt % or more, preferably 50 wt % or more, preferably at 55 wt % or more, preferably 60 wt % or more, preferably at 65 wt % or more, preferably 70 wt % or more, preferably at 75 wt % or more, preferably 80 wt % or more, preferably at 85 wt % or more.

In a preferred embodiment ethylene is present in the polymerization system at 45 wt % or more, preferably 50 wt % or more, preferably at 55 wt % or more, preferably 60 wt % or more, preferably at 65 wt % or more, preferably 70 wt % or more, preferably at 75 wt % or more, preferably 80 wt % or more, preferably at 85 wt % or more. In a preferred embodiment ethylene and up to 30 mol % of one or more comonomers are present in the polymerization system at 45 wt % or more, preferably 50 wt % or more, preferably at 55 wt % or more, preferably 60 wt % or more, preferably at 65 wt % or more, preferably 70 wt % or more, preferably at 75 wt % or more, preferably 80 wt % or more, preferably at 85 wt % or more.

In particularly preferred embodiments the temperature of the polymerization system is between 140 and 170° C. and the pressure of the polymerization system is between 15 and 60 MPa. In further particularly preferred embodiments the temperature of the polymerization system is between 140 and 170° C. and the pressure of the polymerization system is between 20 and 60 MPa.

In further particularly preferred embodiments the temperature of the polymerization system is between 140 and 170° C. and the pressure is of the polymerization system between 25 and 60 MPa. In further particularly preferred embodiments the temperature of the polymerization system is between 140 and 170° C. and the pressure of the polymerization system is between 30 and 60 MPa.

Preferred hydrocarbon diluents for use in the present invention include one or more of $C_1$-$C_{24}$ alkanes, such as ethane, propane, n-butane, i-butane, n-pentane, i-pentane, n-hexane, toluene, cyclohexane, xylene, mixed hexanes and cyclopentane. In some preferred embodiments the diluent comprises one or more of ethane, propane, and isobutane. In some preferred embodiments the diluent is recyclable. Preferred diluents also include $C_6$ to $C_{150}$ isoparaffins, preferably $C_6$ to $C_{100}$ isoparaffins, preferably $C_6$ to $C_{25}$ isoparaffins, more preferably $C_8$ to $C_{20}$ isoparaffins. By isoparaffin is meant that the paraffin chains possess $C_1$ to $C_{10}$ alkyl branching along at least a portion of each paraffin chain. More particularly, the isoparaffins are saturated aliphatic hydrocarbons whose molecules have at least one carbon atom bonded to at least three other carbon atoms or at least one side chain (i.e., a molecule having one or more tertiary or quaternary carbon atoms), and preferably wherein the total number of carbon atoms per molecule is in the range between 6 to 50, and between 10 and 24 in another embodiment, and from 10 to 15 in yet another embodiment. Various isomers of each carbon number will typically be present. The isoparaffins may also include cycloparaffins with branched side chains, generally as a minor component of the isoparaffin. Preferably the density (ASTM 4052, 15.6/15.6° C.) of these isoparaffins ranges from 0.70 to 0.83 g/cm$^3$; the pour point is −40° C. or less, preferably −50° C. or less, the viscosity (ASTM 445, 25° C.) is from 0.5 to 20 cSt at 25° C.; and the average molecular weights in the range of 100 to 300 g/mol. Suitable isoparaffins are commercially available under the tradename ISOPAR (ExxonMobil Chemical Company, Houston Tex.), and are described in, for example, U.S. Pat. Nos. 6,197,285, 3,818, 105 and 3,439,088, and sold commercially as ISOPAR series of isoparaffins. Other suitable isoparaffins are also commercial available under the trade names SHELLSOL (by Shell), SOLTROL (by Chevron Phillips) and SASOL (by Sasol Limited). SHELLSOL is a product of the Royal Dutch/Shell Group of Companies, for example Shellsol™ (boiling point=215-260° C.). SOLTROL is a product of Chevron Phillips Chemical Co. LP, for example SOLTROL 220 (boiling point=233-280° C.). SASOL is a product of Sasol Limited (Johannesburg, South Africa), for example SASOL LPA-210, SASOL-47 (boiling point=238-274° C.).

In another embodiment, preferred diluents include $C_5$ to $C_{25}$ n-paraffins, preferably $C_5$ to $C_{20}$ n-paraffins, preferably $C_5$ to $C_{15}$ n-paraffins having less than 0.1%, preferably less than 0.01% aromatics. Suitable n-paraffins are commercially available under the tradename NORPAR (ExxonMobil Chemical Company, Houston Tex.), and are sold commercially as NORPAR series of n-paraffins. In another embodiment preferred diluents include dearomaticized aliphatic hydrocarbon comprising a mixture of normal paraffins, isoparaffins and cycloparaffins. Typically they are a mixture of $C_4$ to $C_{25}$ normal paraffins, isoparaffins and cycloparaffins, preferably $C_5$ to $C_{18}$, preferably $C_5$ to $C_{12}$. They contain very low levels of aromatic hydrocarbons, preferably less than 0.1, preferably less than 0.01 aromatics. Suitable dearomatized aliphatic hydrocarbons are commercially available under the tradename EXXSOL (ExxonMobil Chemical Company, Houston Tex.), and are sold commercially as EXXSOL series of dearomaticized aliphatic hydrocarbons.

In another embodiment the polymerization medium comprises up to 20 weight % (based upon the weight of the polymerization medium) of oligomers of $C_6$ to $C_{14}$ olefins and/or oligomers of linear olefins having 6 to 14 carbon atoms, more preferably 8 to 12 carbon atoms, more preferably 10 carbon atoms having a Kinematic viscosity of 10 or more (as measured by ASTM D 445); and preferably having a viscosity index ("VI"), as determined by ASTM D-2270 of 100 or more. In another embodiment the polymerization medium comprises up to 20 weight % of oligomers of $C_{20}$ to $C_{1500}$ paraffins, preferably $C_{40}$ to $C_{1000}$ paraffins, preferably $C_{50}$ to $C_{750}$ paraffins, preferably $C_{50}$ to $C_{500}$ paraffins. In another embodiment the polymerization medium comprises up to 20 weight % of oligomers of 1-pentene, 1-hexene, 1-heptene, 1-octene, 1-nonene, 1-decene, 1-undecene and 1-dodecene. Such oligomers are commercially available as SHF and SuperSyn PAO's (ExxonMobil Chemical Company, Houston Tex.). Other useful oligomers include those sold under the tradenames Synfluid™ available from Chevron-Phillips Chemical Co. in Pasadena Tex., Durasyn™ available from BP Amoco Chemicals in London England, Nexbase™ available from Fortum Oil and Gas in Finland, Synton™ available from Crompton Corporation in Middlebury Conn., USA, EMERY™ available from Cognis Corporation in Ohio, USA.

With regard to propylene polymerization media, preferred monomers and diluents are those that are soluble in and inert to propylene and any other polymerization components at the polymerization temperatures and pressures.

In another preferred embodiment the polymerization temperature is from 92 to 330° C., preferably 95 to 250° C., more preferably 100 to 200° C., more preferably 105 to 150° C., more preferably 120 to 160° C. more preferably 120 to 140° C., more preferably 140 to 160° C. Theoretically, pressure can go as high as can be commercially contained. More practically, pressure is limited by the desired properties of the resulting polypropylene. The following pressures, in MPa, are useful lower pressure limits for all invention processes: 4.62, 5, 10, 15, 30, 50, 60, 80, 100, 120, 140, 150, 160, 180, 200, 250, 260, 300, 330, 350, 400, 440, 500, and 600. The following pressures, in MPa, are useful upper pressure limits for all invention processes: 10, 15, 30, 50, 60, 80, 100, 120, 140, 150, 160, 180, 200, 250, 260, 300, 330, 350, 400, 440, 500, 600, and 1000 MPa.

In a preferred embodiment the polymerization pressure is from 4.6 to 1000 MPa, preferably 15 to 500 MPa, more preferably 15 to 400 MPa, more preferably 15 to 300 MPa, more preferably 15 to 250 MPa, more preferably 15 to 200 MPa, more preferably 15 to 400 MPa, more preferably 15 to 190 MPa, more preferably 154.6 to 180 MPa, more preferably 15 to 170 MPa. In another embodiment the lower limit in all of the above ranges is 20 MPa, rather than 15 MPa. In another embodiment the lower limit in all of the above ranges is 25 MPa, rather than 15 MPa. In another embodiment the lower limit in all of the above ranges is 30 MPa, rather than 15 MPa. In another embodiment the lower limit in all of the above ranges is 40 MPa, rather than 15 MPa. In another embodiment the lower limit in all of the above ranges is 50 MPa, rather than 15 MPa.

It is expected that any temperature range can be combined with any pressure range, provided that the chosen temperature and pressure are such that the reaction medium is above its cloud point (or within 10 MPa of the cloud point).

Temperatures above 140° C. and pressures between 100-150 MPa are particularly useful.

In any of the embodiments described herein the materials stripped or flashed off may be passed through activated carbon to remove all or part of the FC's.

Monomers

Polymers produced according to this invention are olefin polymers or "polyolefins". By olefin polymers is meant that at least 75 mole % of the polymer is made of hydrocarbon monomers, preferably at least 80 mole %, preferably at least 85 mole %, preferably at least 90 mole %, preferably at least 95 mole %, preferably at least 99 mole %. In a particularly preferred embodiment, the polymers are 100 mole % hydrocarbon monomer. Hydrocarbon monomers are monomers made up of only carbon and hydrogen. In another embodiment of the invention up to 25 mol % of the polyolefin is derived from heteroatom containing monomers. Heteroatom containing monomers are hydrocarbon monomers where one or more hydrogen atoms have been replaced by a heteroatom. In a preferred embodiment, the heteroatom is selected from the group consisting of chlorine, bromine, oxygen, nitrogen, silicon and sulfur, preferably the heteroatom is selected from the group consisting of oxygen, nitrogen, silicon and sulfur, preferably the heteroatom is selected from the group consisting of oxygen and nitrogen, preferably oxygen. In a preferred embodiment, the heteroatom is not fluorine. In another embodiment of the invention, the monomers to be polymerized are not fluoromonomers. Fluoromonomers are defined to be hydrocarbon monomers where at least one hydrogen atom has been replaced by a fluorine atom. In another embodiment of the invention, the monomers to be polymerized are not halomonomers. (By halomonomer is meant a hydrocarbon monomer where at least one hydrogen atom is replaced by a halogen.) In another embodiment of the invention, the monomers to be polymerized are not vinyl aromatic hydrocarbons. In another embodiment of the invention, the monomers to be polymerized are preferably aliphatic or alicyclic hydrocarbons. (as defined under "Hydrocarbon" in Hawley's Condensed Chemical Dictionary, 13th edition, R. J. Lewis ed., John Wiley and Sons, New York, 1997. In another embodiment of the invention, the monomers to be polymerized are preferably linear or branched alpha-olefins, preferably C2 to C40 linear or branched alpha-olefins, preferably C2 to C20 linear or branched alpha-olefins, preferably ethylene, propylene, butene, pentene, hexene, heptene, octene, nonene, decene, undecene, dodecene, or mixtures thereof, more preferably ethylene, propylene, butene hexene and octene.

In a preferred embodiment the processes of this invention are used to polymerize any unsaturated monomer or monomers. Preferred monomers include $C_2$ to $C_{100}$ olefins, preferably $C_2$ to $C_{60}$ olefins, preferably $C_2$ to $C_{40}$ olefins preferably $C_2$ to $C_{20}$ olefins, preferably $C_2$ to $C_{12}$ olefins. In some embodiments preferred monomers include linear, branched or cyclic alpha-olefins, preferably $C_2$ to $C_{100}$ alpha-olefins, preferably $C_2$ to $C_{60}$ alpha-olefins, preferably $C_2$ to $C_{40}$ alpha-olefins preferably $C_2$ to $C_{20}$ alpha-olefins, preferably $C_2$ to $C_{12}$ alpha-olefins. Preferred olefin monomers may be one or more of ethylene, propylene, butene, pentene, hexene, heptene, octene, nonene, decene, dodecene, 4-methyl-pentene-1, 3-methyl pentene-1,3,5,5-trimethyl hexene 1, and 5-ethyl-1-nonene.

In another embodiment the monomer comprises a linear or branched $C_3$ to $C_{30}$ prochiral alpha-olefins or $C_5$ to $C_{30}$ ring containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalyst(s).

Preferred monomers may also include aromatic-group-containing monomers containing up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, paramethyl styrene, 4-phenyl-1-butene and allyl benzene.

Non aromatic cyclic group containing monomers are also preferred for use in the invention herein. These monomers can contain up to 30 carbon atoms. Suitable non-aromatic cyclic group containing monomers preferably have at least one polymerizable olefinic group that is either pendant on the cyclic structure or is part of the cyclic structure. The cyclic structure may also be further substituted by one or more hydrocarbyl groups such as, but not limited to, $C_1$ to $C_{10}$ alkyl groups. Preferred non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantane, norbornene, and the like.

Diolefin monomers may also be used in the practice of this invention. Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

Polar unsaturated monomers may also be used in the practice of this invention. Non-limiting examples of preferred polar unsaturated monomers include 6-nitro-1-hexene, N-methylallylamine, N-allylcyclopentylamine, N-allylhexylamine, methyl vinyl ketone, ethyl vinyl ketone, 5-hexen-2-one, 2-acetyl-5-norbornene, 7-syn methoxymethyl-5-norbornen-2-one, acrolein, 2,2-dimethyl-4-pentenal, undecylenic aldehyde, 2,4-dimethyl-2,6-heptadienal, acrylic acid, vinylacetic acid, 4-pentenoic acid, 2,2-dimethyl-4-pentenoic acid, 6-heptenoic acid, trans-2,4-pentadienoic acid, 2,6-heptadienoic acid, nona-fluoro-1-hexene, allyl alcohol, 7-octene-1,2-diol, 2-methyl-3-buten-1-ol, 5-norbornene-2-carbonitrile, 5-norbornene-2-carboxaldehyde, 5-norbornene-2-carboxylic acid, cis-5-norbornene-endo-2,3-dicarboxylic acid, 5-norbornene-2,2,-dimethanol, cis-5-norbornene-endo-2,3-dicarboxylic anhydride, 5-norbornene-2-endo-3-endo-dimethanol, 5-norbornene-2-endo-3-exo-dimethanol, 5-norbornene-2-methanol, 5-norbornene-2-ol, 5-norbornene-2-yl acetate, 1-[2-(5-norbornene-2-yl)ethyl]-3,5,7,9,11,13,15-heptacyclopentylpentacyclo[9.5.1.1$^{3,9}$.1$^{5,15}$.1$^{7,13}$] octasiloxane, 2-benzoyl-5-norbornene, allyl 1,1,2,2,-tetrafluoroethyl ether, acrolein dimethyl acetal, butadiene monoxide, 1,2-epoxy-7-octene, 1,2-epoxy-9-decene, 1,2-epoxy-5-hexene, 2-methyl-2-vinyloxirane, allyl glycidyl ether, 2,5-dihydrofuran, 2-cyclopenten-1-one ethylene ketal, allyl disulfide, ethyl acrylate, methyl acrylate.

In a preferred embodiment the processes described herein may be used to produce homopolymers or copolymers. (For the purposes of this invention and the claims thereto a copolymer may comprise two, three, four or more different monomer units.) Preferred polymers produced herein include homopolymers or copolymers of any of the above monomers. In a preferred embodiments the polymer is a homopolymer of any $C_2$ to $C_{12}$ alpha-olefin, preferably any $C_3$ to $C_{12}$ alpha-olefin. Preferably the polymer is a homopolymer of ethylene or a homopolymer of propylene. In another embodiment the polymer is a copolymer comprising ethylene and one or more of any of the monomers listed above. In another embodiment the polymer is a copolymer comprising propylene and one or more of any of the monomers listed above. In another preferred embodiment the homopolymers or copolymers described, additionally comprise one or more diolefin comonomers, preferably one or more $C_4$ to $C_{40}$ diolefins.

In another preferred embodiment the polymer produced herein is a copolymer of ethylene and one or more $C_3$ to $C_{20}$ linear, branched or cyclic monomers, preferably one or more $C_3$ to $C_{12}$ linear, branched or cyclic alpha-olefins. Preferably the polymer produced herein is a copolymer of ethylene and one or more of propylene, butene, pentene, hexene, heptene, octene, nonene, decene, dodecene, 4-methylpentene-1,3-methylpentene-1,3,5,5-trimethylhexene-1, cyclopentene, 4-methylcyclopentene, cyclohexene, and 4-methylcyclohexene.

In another preferred embodiment the polymer produced herein is a copolymer of propylene and one or more $C_2$ or $C_4$ to $C_{20}$ linear, branched or cyclic monomers, preferably one or more $C_2$ or $C_4$ to $C_{12}$ linear, branched or cyclic alpha-olefins. Preferably the polymer produced herein is a copolymer of propylene and one or more of ethylene, butene, pentene, hexene, heptene, octene, nonene, decene, dodecene, 4-methylpentene-1,3-methylpentene-1, and 3,5,5-trimethylhexene-1.

In a preferred embodiment, the polymer produced herein is a homopolymer of norbornene or a copolymer of norbornene and a substituted norbornene, including polar functionalized norbornenes.

In a preferred embodiment the polymers described above further comprise one or more dienes at up to 10 weight %, preferably at 0.00001 to 1.0 weight %, preferably 0.002 to 0.5 weight %, even more preferably 0.003 to 0.2 weight %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

In a preferred embodiment the copolymers described herein comprise at least 50 mole % of a first monomer and up to 50 mole % of other monomers.

In another embodiment, the polymer comprises:

a first monomer present at from 40 to 95 mole %, preferably 50 to 90 mole %, preferably 60 to 80 mole %, and a comonomer present at from 5 to 60 mole %, preferably 10 to 40 mole %, more preferably 20 to 40 mole %, and a termonomer present at from 0 to 10 mole %, more preferably from 0.5 to 5 mole %, more preferably 1 to 3 mole %.

In a preferred embodiment the first monomer comprises one or more of any $C_3$ to $C_8$ linear branched or cyclic alpha-olefins, including propylene, butene, (and all isomers thereof), pentene (and all isomers thereof), hexene (and all isomers thereof), heptene (and all isomers thereof), and octene (and all isomers thereof). Preferred monomers include propylene, 1-butene, 1-hexene, 1-octene, cyclopentene, cyclohexene, cyclooctene, hexadiene, cyclohexadiene and the like.

In a preferred embodiment the comonomer comprises one or more of any $C_2$ to $C_{40}$ linear, branched or cyclic alpha-olefins (provided ethylene, if present, is present at 5 mole % or less), including ethylene, propylene, butene, pentene, hexene, heptene, and octene, nonene, decene, undecene, dodecene, hexadecene, butadiene, hexadiene, heptadiene, pentadiene, octadiene, nonadiene, decadiene, dodecadiene, styrene, 3,5,5-trimethylhexene-1,3-methylpentene-1,4-methylpentene-1, cyclopentadiene, and cyclohexene.

In a preferred embodiment the termonomer comprises one or more of any $C_2$ to $C_{40}$ linear, branched or cyclic alpha-olefins, (provided ethylene, if present, is present at 5 mole % or less), including ethylene, propylene, butene, pentene, hexene, heptene, and octene, nonene, decene, undecene, dodecene, hexadecene, butadiene, hexadiene, heptadiene, pentadiene, octadiene, nonadiene, decadiene, dodecadiene, styrene, 3,5,5-trimethylhexene-1,3-methylpentene-1,4-methylpentene-1, cyclopentadiene, and cyclohexene.

In a particularly preferred embodiment, the polymer produced herein is a copolymer comprising propylene and ethylene, preferably the copolymer comprises less than 40 weight % ethylene, more preferably less than 30 weight % ethylene, preferably the copolymer comprises less than 20 weight % ethylene, more preferably less than 10 weight % ethylene.

Catalyst Systems

The processes described herein are preferably used with a catalyst system comprising a catalyst compounds in combination with an activator. A catalyst system is defined to be the combination of at least one catalyst compound and at least one activator.

Catalyst Compounds

Catalyst compounds that may be used in the processes of this invention include any catalyst compound that can polymerize monomers under supercritical polymerization conditions. Such catalyst compounds typically do not decompose at polymerization temperatures.

In a preferred embodiment, the processes described herein can use any olefin polymerization catalyst capable of polymerizing propylene if that catalyst is sufficiently active under invention polymerization conditions. Thus, Group-3-10 transition metals can form suitable polymerization catalysts. A suitable olefin polymerization catalyst will be able to coordinate to, or otherwise associate with, an alkenyl unsaturation.

Conventional-type transition metal catalysts may be used in the practice of this invention and are those catalysts that are traditional Ziegler-Natta catalysts and Phillips-type chromium catalyst well known in the art. Examples of conventional-type transition metal catalysts are discussed in U.S. Pat. Nos. 4,115,639, 4,077,904 4,482,687, 4,564,605, 4,721, 763, 4,879,359 and 4,960,741 all of which are herein fully incorporated by reference. The conventional-type transition metal catalyst compounds that may be used in the present invention include transition metal compounds from Groups 3 to 10, preferably 4 to 6 of the Periodic Table of Elements.

These conventional-type transition metal catalysts may be represented by the formula:

$$MR_x$$

where M is a metal from Groups 3 to 10, preferably Group 4, more preferably titanium; R is a halogen or a hydrocarbyloxy group; and x is the valence of the metal M, preferably x is 1, 2, 3 or 4, more preferably x is 4. Non-limiting examples of R include alkoxy, phenoxy, bromide, chloride and fluoride. Non-limiting examples of conventional-type transition metal catalysts where M is titanium include $TiCl_3$, $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3 \cdot \frac{1}{3}AlCl_3$ and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566, which are herein fully incorporate by reference. The $MgTiCl_6$ (ethyl acetate)$_4$ derivative is particularly preferred. British Patent Application 2,105,355, herein incorporated by reference, describes various conventional-type vanadium catalyst compounds. Non-limiting examples of conventional-type vanadium catalyst compounds include vanadyl trihalide, alkoxy halides and alkoxides such as $VOCl_3$, $VOCl_2(OBu)$ where Bu is butyl and $VO(OC_2H_5)_3$; vanadium tetra-halide and vanadium alkoxy halides such as $VCl_4$ and $VCl_3(OBu)$; vanadium and vanadyl acetyl acetonates and chloroacetyl acetonates such as $V(AcAc)_3$ and $VOCl_2(AcAc)$ where (AcAc) is an acetyl acetonate. The preferred conventional-type vanadium catalyst compounds are $VOCl_3$, $VCl_4$ and $VOCl_2$—OR where R is a hydrocarbon radical, preferably a $C_1$ to $C_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Conventional-type chromium catalyst compounds, often referred to as Phillips-type catalysts, suitable for use in the present invention include $CrO_3$, chromocene, silyl chromate, chromyl chloride ($CrO_2Cl_2$), chromium-2-ethyl-hexanoate, chromium acetylacetonate ($Cr(AcAc)_3$), and the like. Non-limiting examples are disclosed in U.S. Pat. Nos. 2,285,721, 3,242,099 and 3,231,550, which are herein fully incorporated by reference.

Still other conventional-type transition metal catalyst compounds and catalyst systems suitable for use in the present invention are disclosed in U.S. Pat. Nos. 4,124,532, 4,302,565, 4,302,566 and 5,763,723 and published EP-A2 0 416 815 A2 and EP-A1 0 420 436, which are all herein incorporated by reference.

The conventional-type transition metal catalysts of the invention may also have the general formula:

$$M'_tM''X_{2t}Y_uE$$

where M' is Mg, Mn and/or Ca; t is a number from 0.5 to 2; M" is a transition metal such as Ti, V and/or Zr; X is a halogen, preferably Cl, Br or I; Y may be the same or different and is halogen, alone or in combination with oxygen, —$NR^2$, —OR, —SR, —COOR, or —OSOOR, where R is a hydrocarbyl radical, in particular an alkyl, aryl, cycloalkyl or arylalkyl radical, acetylacetonate anion in an amount that satisfies the valence state of M'; u is a number from 0.5 to 20; E is an electron donor compound selected from the following classes of compounds: (a) esters of organic carboxylic acids; (b) alcohols; (c) ethers; (d) amines; (e) esters of carbonic acid; (f) nitriles; (g) phosphoramides, (h) esters of phosphoric and phosphorus acid, and (j) phosphorus oxy-chloride. Non-limiting examples of complexes satisfying the above formula include: $MgTiCl_5 \cdot 2CH_3COOC_2H_5$, $Mg_3Ti_2C_{12} \cdot 7CH_3COOC_2H_5$, $MgTiCl_5 \cdot 6C_2H_5OH$, $MgTiCl_5 \cdot 100CH_3OH$, $MgTiCl_5 \cdot$ tetrahydrofuran, $MgTi_2Cl_{12} \cdot 7C_6H_5CN$, $Mg_3Ti_2Cl_{12} \cdot 6C_6H_5COOC_2H_5$, $MgTiCl_6 \cdot 2CH_3COOC_2H_5$, $MgTiCl_6 \cdot 6C_5H_5N$, $MnTiCl_5 \cdot 4C_2H_5OH$, $MgTiCl_5(OCH_3) \cdot 2CH_3COOC_2H_5$, $MgTiCl_5N(C_6H_5)_2 \cdot 3CH_3COOC_2H_5$, $MgTiBr_2Cl_4 \cdot 2(C_2H_5)_2O$, $Mg_3V_2Cl_{12} \cdot 7CH_3$—$COOC_2H_5$, $MgZrCl_6 \cdot 4$ tetrahydrofuran. Other catalysts may include cationic catalysts such as $AlCl_3$, and other cobalt and iron catalysts well known in the art.

Typically, these conventional-type transition metal catalyst compounds (excluding some conventional-type chromium catalyst compounds) are activated with one or more of the conventional-type cocatalysts represented by the formula:

$$M^3M^4_vX^2_cR^3_{b-c}$$

wherein $M^3$ is a metal from Group 1, 2, 12 and 13 of the Periodic Table of Elements; $M^4$ is a metal of Group IA of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1.

Other conventional-type organometallic cocatalyst compounds for the above conventional-type transition metal catalysts have the formula:

$$M^3R^3_k$$

where $M^3$ is a Group 1, 2, 12 or 13 metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent hydrocarbon radical.

Non-limiting examples of conventional-type organometallic cocatalyst compounds of Groups 1, 2, 12 and 13 useful with the conventional-type catalyst compounds described above include methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and tri-isobutylaluminum. Other conventional-type cocatalyst compounds include mono-organohalides and hydrides of Group 2 metals, and mono- or di-organohalides and hydrides of Group 13 metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art, and a more complete discussion of these compounds may be found in U.S. Pat. Nos. 3,221,002 and 5,093,415, which are herein fully incorporated by reference.

In some embodiment, however, it is preferred that the catalyst system not comprise titanium tetrachloride, particularly not the combination of $TiCl_4$ and aluminum alkyl (such as triethylaluminum), particularly when the FC is a perfluorocarbon. In situations where the catalyst is titanium tetrachloride, particularly the combination of $TiCl_4$ and aluminum alkyl (such as triethylaluminum) the FC is preferably a hydrofluorocarbon. In another embodiment, the catalyst is not a free radical initiator, such as a peroxide.

For purposes of this patent specification and appended claims conventional-type transition metal catalyst compounds exclude those metallocene-type catalyst compounds discussed below.

Further polymerization catalysts useful in the invention include one or more metallocene compounds (also referred to herein as metallocenes). Typical metallocene compounds are generally described as containing one or more bulky ligand(s) and one or more leaving group(s) bonded to at least one metal atom. The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements; preferably the atoms are selected from the group consisting of carbon, nitrogen, oxygen, silicon, sulfur, phosphorous, germanium, boron and aluminum or a combination thereof. Most preferably, the ring(s) or ring system(s) are composed of carbon atoms such as, but not limited to, those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthamide or actinide series of the Periodic Table of Elements. Preferably the metal is a transition metal from Groups 4 through 12, more preferably Groups 4, 5 and 6, and most preferably the transition metal is from Group 4.

Preferred examples of these metallocene-type catalyst compounds and catalyst systems are described in U.S. Pat. Nos. 4,530,914, 4,871,705, 4,937,299, 5,017,714, 5,055,438, 5,096,867, 5,120,867, 5,124,418, 5,198,401, 5,210,352, 5,229,478, 5,264,405, 5,278,264, 5,278,119, 5,304,614, 5,324,800, 5,347,025, 5,350,723, 5,384,299, 5,391,790, 5,391,789, 5,399,636, 5,408,017, 5,491,207, 5,455,366, 5,534,473, 5,539,124, 5,554,775, 5,621,126, 5,684,098, 5,693,730, 5,698,634, 5,710,297, 5,712,354, 5,714,427, 5,714,555, 5,728,641, 5,728,839, 5,753,577, 5,767,209, 5,770,753 and 5,770,664 all of which are herein fully incorporated by reference. Also, the disclosures of European publications EP-A-0 591 756, EP-A-0 520 732, EP-A-0 420 436, EP-B1 0 485 822, EP-B1 0 485 823, EP-A2-0 743 324 and EP-B1 0 518 092 and PCT publications WO 91/04257, WO 92/00333, WO 93/08221, WO 93/08199, WO 94/01471, WO 96/20233, WO 97/15582, WO 97/19959, WO 97/46567, WO 98/01455, WO 98/06759, WO 98/011144, and WO 03/040442 are all herein fully incorporated by reference for purposes of describing typical bulky ligand metallocene-type catalyst compounds and catalyst systems.

In one embodiment, the catalyst compound used in this invention comprises a metallocene catalyst compounds represented by the formula:

$$L^A L^B MQ_n \quad (V)$$

where M is a metal atom from the Periodic Table of the Elements and may be a Group 3 to 12 metal or from the lanthamide or actinide series of the Periodic Table of Elements, preferably M is a Group 4, 5 or 6 transition metal, more preferably M is a Group 4 transition metal, even more preferably M is zirconium, hafnium or titanium. The ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of π-bonding to M. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a heterocyclopentadienyl ancillary ligand. Other $L^A$ and $L^B$ ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of ligand that is bonded to M. In one embodiment only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris (trifluoromethyl)silyl, methyl-bis(difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. In one embodiment, Q is a monoanionic labile ligand having a sigma-bond to M. Depending on the oxidation state of the metal, the value for n is 0, 1 or 2 such that Formula V above represents a neutral bulky ligand metallocene catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like.

In another embodiment, the catalyst composition iseful herein may include one or more metallocene catalyst compounds where $L^A$ and $L^B$ of Formula V are bridged to each other by at least one bridging group, A, as represented by:

$$L^A A L^B M Q_n \qquad (VI)$$

wherein $L^A$, $L^B$, M, Q and n are as defined above. These compounds of Formula VI are known as bridged metallocene catalyst compounds. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Si R'_2Si$, $R'_2Ge$, $R'P$, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged metallocene catalyst compounds of Formula VI have two or more bridging groups, see EP 664 301 B1 for more information.

In another embodiment, the metallocene catalyst compounds are those where the R substituents on the ligands $L^A$ and $L^B$ of Formulas V and VI are substituted with the same or different number of substituents on each of the ligands. In another embodiment, the ligands $L^A$ and $L^B$ of Formulas V and VI are different from each other.

Other metallocene catalyst compounds and catalyst systems useful in the invention include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517 and 5,939,503 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

In another embodiment, the catalyst compositions of the invention may include bridged heteroatom, mono-cyclopentadienyl ligand metallocene compounds. These types of catalysts and catalyst systems are described in, for example, PCT publication WO 92/00333, WO 94/07928, WO 91/04257, WO 94/03506, WO96/00244, WO 97/15602 and WO 99/20637 and U.S. Pat. Nos. 5,057,475, 5,096,867, 5,055, 438, 5,198,401, 5,227,440 and 5,264,405 and European publication EP-A-0 420 436, all of which are herein fully incorporated by reference.

In another embodiment, the catalyst composition of the invention includes one or more metallocene catalyst compounds represented by Formula VII:

$$L^C A J M Q_n \qquad (VII)$$

where M is a Group 3 to 16 metal atom or a metal selected from the Group of actinides and lanthamides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted ligand bonded to M and is as defined for $L^A$ above; J is bonded to M; A is bonded to J and $L^C$; J is a heteroatom ancillary ligand; and A is a bridging group; Q is a univalent anionic ligand; and n is the integer 0, 1 or 2. In Formula VII above, $L^C$, A and J form a fused ring system. In an embodiment, $L^C$ of Formula V is as defined above for $L^A$, and A, M and Q of Formula VII are as defined above in Formula V.

In Formula VII, J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred. In a preferred embodiment, when the catalyst system comprises compounds represented by Formula VII, the fluorocarbon preferably is a hydrofluorocarbon. Preferably, when the catalyst system comprises compounds represented by Formula VII, the fluorocarbon is not a perfluorocarbon.

In an embodiment of the invention, the metallocene catalyst compounds are heterocyclic ligand complexes where the ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these metallocene catalyst compounds are described in WO 96/33202, WO 96/34021, WO 97/17379 and WO 98/22486 and EP-A1-0 874 005 and U.S. Pat. Nos. 5,637,660, 5,539,124, 5,554,775, 5,756,611, 5,233,049, 5,744,417, and 5,856,258 all of which are herein incorporated by reference.

In another embodiment, useful catalyst compounds include those complexes known as transition metal catalysts based on bidentate ligands containing pyridine or quinoline moieties, such as those described in U.S. application Ser. No. 09/103,620 filed Jun. 23, 1998, which is herein incorporated by reference. In another embodiment, useful catalyst compounds are those described in PCT publications WO 99/01481 and WO 98/42664, which are fully incorporated herein by reference.

In another embodiment, useful catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In another embodiment, a useful catalyst compound is represented by Formula VIII:

$$L^D MQ_2(YZ)X_n \qquad (VIII)$$

where M is a Group 3 to 16 metal, preferably a Group 4 to 12 transition metal, and most preferably a Group 4, 5 or 6 transition metal; $L^D$ is as defined for $L^A$ above and is bonded to M; each Q is independently bonded to M and $Q_2(YZ)$ forms a ligand, preferably a unicharged polydentate ligand; or Q is a univalent anionic ligand also bonded to M; X is a univalent anionic group when n is 2 or X is a divalent anionic group when n is 1; n is 1 or 2. In Formula VIII, L and M are as defined above for Formula V. Q is as defined above for Formula V, preferably Q is selected from the group consisting of —O—, —NR—, —CR$_2$— and —S—; Y is either C or S; Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from one of the group consisting of —OR, —NR$^2$, —SR, —SiR$_3$, —PR$_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

Still other useful catalysts include those multinuclear metallocene catalysts as described in WO 99/20665 and 6,010,794, and transition metal metaaracyle structures described in EP 0 969 101 A2, which are herein incorporated herein by reference. Other metallocene catalysts include those described in EP 0 950 667 A1, double cross-linked metallocene catalysts (EP 0 970 074 A1), tethered metallocenes (EP 970 963 A2) and those sulfonyl catalysts described in U.S. Pat. No. 6,008,394, which are incorporated herein by reference.

It is also contemplated that in one embodiment the catalysts described above include their structural or optical or enantiomeric isomers (meso and racemic isomers, for example see U.S. Pat. No. 5,852,143, incorporated herein by reference) and mixtures thereof.

In another embodiment, a useful catalyst is a complex of a transition metal, a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

The catalyst compositions useful in this invention also include one or more complexes known as transition metal catalysts based on bidentate ligands containing pyridine or quinoline moieties, such as those described in U.S. Pat. No. 6,103,657, which is herein incorporated by reference. In one embodiment, these catalyst compounds are represented by the formula:

$$((Z)XA_t(YJ))_q MQ_n \qquad (IX)$$

where M is a metal selected from Group 3 to 13 or lanthamide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X, Y or J, preferably X and J; q is 1 or 2; n is an integer from 1 to 4 depending on the oxidation state of M. In one embodiment, where X is oxygen or sulfur then Z is optional.

In another embodiment, where X is nitrogen or phosphorous then Z is present. In an embodiment, Z is preferably an aryl group, more preferably a substituted aryl group.

In another embodiment of the invention useful catalyst compounds include nitrogen containing heterocyclic ligand complexes, also known as transition metal catalysts based on bidentate ligands containing pyridine or quinoline moieties, such as those described in WO 96/33202, WO 99/01481 and WO 98/42664 and U.S. Pat. No. 5,637,660, which are herein all incorporated by reference.

It is within the scope of this invention, in one embodiment, the catalyst compounds include complexes of $Ni^{2+}$ and $Pd^{2+}$ described in the articles Johnson, et al., "New Pd(II)- and Ni(II)-Based Catalysts for Polymerization of Ethylene and a-Olefins", J. Am. Chem. Soc. 1995, 117, 6414-6415 and Johnson, et al., "Copolymerization of Ethylene and Propylene with Functionalized Vinyl Monomers by Palladium(II) Catalysts", J. Am. Chem. Soc., 1996, 118, 267-268, and WO 96/23010 published Aug. 1, 1996, WO 99/02472, U.S. Pat. Nos. 5,852,145, 5,866,663 and 5,880,241, which are all herein fully incorporated by reference. These complexes can be either dialkyl ether adducts, or alkylated reaction products of the described dihalide complexes that can be activated to a cationic state by the activators of this invention described below.

Also included as catalyst compounds useful herein are those diimine based ligands for Group 8 to 10 metal compounds disclosed in PCT publications WO 96/23010 and WO 97/48735 and Gibson, et. al., Chem. Comm., pp. 849-850 (1998), all of which are herein incorporated by reference.

Other catalysts useful herein are those Group 5 and 6 metal imido complexes described in EP-A2-0 816 384 and U.S. Pat. No. 5,851,945, which is incorporated herein by reference. In addition, catalysts useful herein include bridged bis(arylamido) Group 4 compounds described by D. H. McConville, et al., in Organometallics 1195, 14, 5478-5480, which is herein incorporated by reference. Other catalysts useful herein are described as bis(hydroxy aromatic nitrogen ligands) in U.S. Pat. No. 5,852,146, which is incorporated herein by reference. Other metallocene-type catalysts containing one or more Group 15 atoms useful herein include those described in WO 98/46651, which is herein incorporated herein by reference. Still another catalysts useful herein include those multinuclear bulky ligand metallocene-type catalysts as described in WO 99/20665, which is incorporated herein by reference. In addition, useful Group 6 metallocene catalyst systems are described in U.S. Pat. No. 5,942,462, which is incorporated herein by reference.

It is contemplated in some embodiments, that the ligands of the catalyst compounds described above may be asymmetrically substituted in terms of additional substituents or types of substituents, and/or unbalanced in terms of the number of additional substituents on the ligands or the ligands themselves are different.

It is also contemplated that in one embodiment, the catalysts of the invention include their structural or optical or enantiomeric isomers (meso and racemic isomers) and mixtures thereof. In another embodiment the metallocene-type compounds useful in the invention may be chiral and/or a bridged metallocene-type catalyst compound.

Mixed Catalysts

It is also within the scope of this invention that the above described catalyst compounds can be combined with one or more of the conventional-type transition metal catalysts compounds with one or more co-catalysts or activators or activation methods described above. For example, see U.S. Pat. Nos. 4,937,299, 4,935,474, 5,281,679, 5,359,015, 5,470,811, and 5,719,241 all of which are herein fully incorporated herein reference.

In another embodiment of the invention one or more metallocene-type catalyst compounds or catalyst systems may be used in combination with one or more conventional-type catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996, all of which are herein fully incorporated by reference.

It is further contemplated that two or more conventional-type transition metal catalysts may be combined with one or more conventional-type cocatalysts. Non-limiting examples of mixed conventional-type transition metal catalysts are described in for example U.S. Pat. Nos. 4,154,701, 4,210,559, 4,263,422, 4,672,096, 4,918,038, 5,198,400, 5,237,025, 5,408,015 and 5,420,090, all of which are herein incorporated by reference.

Particularly useful catalyst compounds that may also be used in the practice of this invention include metallocene catalyst compounds represented by formula:

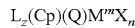

$$L_z(Cp)(Q)M'''X_n$$

where:
Cp is a substituted or unsubstituted cyclopentadienyl ring, a substituted or unsubstituted indenyl ring or a substituted or unsubstituted fluorenyl ring;
Q is a heteroatom containing group;
z is 0 or 1;
L is a bridging group connecting Cp to Q,
M is a Group 4, 5, or 6 transition metal;
m is 3,4, 5 or 6;
X is a halogen or a substituted or unsubstituted hydrocarbyl group, a substituted or unsubstituted hydrocarboxy group, or a substituted or unsubstituted heteroatom containing group; and
n is m minus 2.

In a preferred embodiment, z is 1, L is represented by the formula: RqSi— where each R is, independently, a substituted or unsubstituted $C_1$ to $C_{20}$ hydrocarbyl group and q is 1, 2, 3 or 4; and Q is a nitrogen containing group, preferably a hydrocarbyl group substituted with nitrogen.

Particularly useful catalyst compounds that may also be used in the practice of this invention include metallocene catalyst compounds represented by formula:

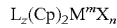

$$L_z(Cp)_2M'''X_n$$

where:
each Cp is independently a substituted or unsubstituted cyclopentadienyl ring, a substituted or unsubstituted indenyl ring or a substituted or unsubstituted fluorenyl ring;
z is 0 or 1;
L is a bridging group connecting Cp to Cp,
M is a Group 4, 5, or 6 transition metal;
m is 3, 4, 5 or 6;
X is a halogen or a substituted or unsubstituted hydrocarbyl group, a substituted or unsubstituted hydrocarboxy group, or a substituted or unsubstituted heteroatom containing group; and
n is m minus 2.

In a preferred embodiment, z is 1, L is represented by the formula: RqSi— where each R is, independently, a substituted or unsubstituted $C_1$ to $C_{20}$ hydrocarbyl group and q is 1, 2, 3 or 4; and both Cp groups are indenyl rings substituted at the 2 and 4 positions.

For purposes of this invention and the claims thereto:

The term "hydrocarbyl radical" is sometimes used interchangeably with "hydrocarbyl" throughout this document. For purposes of this disclosure, "hydrocarbyl radical" encompasses $C_1$-$C_{50}$ radicals. These radicals can be linear, branched, or cyclic including polycyclic. These radicals can be saturated, partially unsaturated or fully unsaturated, and when cyclic, may be aromatic or non-aromatic.

Substituted hydrocarbyl radicals are radicals in which at least one hydrogen atom has been replaced with a heteroatom or with at least one functional group such as NR"$_2$, OR", PR"$_2$, SR", BR"$_2$, SiR"$_3$, GeR"$_3$ and the like or where at least one non-hydrocarbon atom or group has been inserted within the hydrocarbyl radical, such as O, S, NR", PR", BR", SiR"$_2$, GeR"$_2$, and the like, where R" is independently a hydrocarbyl or halocarbyl radical. The functional group can be an organometalloid radical.

Halocarbyl radicals are radicals in which one or more hydrocarbyl hydrogen atoms have been substituted with at least one halogen or halogen-containing group (e.g. F, Cl, Br, I).

Substituted halocarbyl radicals are radicals in which at least one hydrocarbyl hydrogen or halogen atom has been substituted with at least one functional group such as NR"$_2$, OR", PR"$_2$, SR", BR"$_2$, SiR"$_3$, GeR"$_3$ and the like or where at least one non-carbon atom or group has been inserted within the halocarbyl radical such as O, S, NR", PR", BR", SiR"$_2$, GeR"$_2$, and the like where R" is independently a hydrocarbyl or halocarbyl radical provided that at least one halogen atom remains on the original halocarbyl radical. The functional group can be an organometalloid radical.

In some embodiments, the hydrocarbyl radical is independently selected from methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, ethenyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, or triacontynyl isomers. For this disclosure, when a radical is listed it indicates that radical type and all other radicals formed when that radical type is subjected to the substitutions defined above. Alkyl, alkenyl and alkynyl radicals listed include all isomers including where appropriate cyclic isomers, for example, butyl includes n-butyl, 2-methylpropyl, 1-methylpropyl, tertbutyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl and 2-methyl-2-propenyl (and cyclobutenyls and cyclopropenyls). Cyclic compound having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

Particularly preferred catalyst compounds include those metallocene compounds represented by the formula:

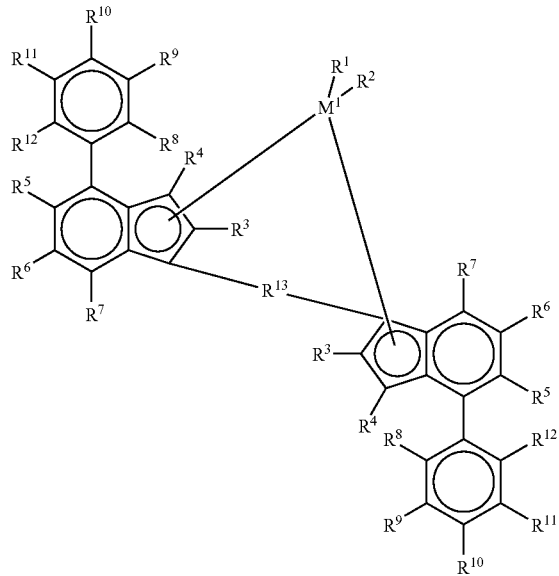

where:

$M^1$ is selected from titanium, zirconium, hafnium, vanadium, niobium, tantalum, chromium, molybdenum, or tungsten; $R^1$ and $R^2$ are identical or different and are selected from hydrogen atoms, $C_1$-$C_{10}$ alkyl groups, $C_1$-$C_{10}$ alkoxy groups, $C_6$-$C_{10}$ aryl groups, $C_6$-$C_{10}$ aryloxy groups, $C_2$-$C_{10}$ alkenyl groups, $C_2$-$C_{40}$ alkenyl groups, $C_7$-$C_{40}$ arylalkyl groups, $C_7$-$C_{40}$ alkylaryl groups, $C_8$-$C_{40}$ arylalkenyl groups, OH groups or halogen atoms; or conjugated dienes that are optionally substituted with one or more hydrocarbyl, tri(hydrocarbyl)silyl groups or hydrocarbyl, tri(hydrocarbyl)silylhydrocarbyl groups. The conjugated diene can contain up to 30 atoms not counting hydrogen; $R^3$-$R^{12}$ are the same or different and are selected from hydrogen atoms, halogen atoms, $C_1$-$C_{10}$ halogenated or unhalogenated alkyl groups, $C_6$-$C_{10}$ halogenated or unhalogenated aryl groups, $C_2$-$C_{10}$ halogenated or unhalogenated alkenyl groups, $C_7$-$C_{40}$ halogenated or unhalogenated arylalkyl groups, $C_7$-$C_{40}$ halogenated or unhalogenated alkylaryl groups, $C_8$-$C_{40}$ halogenated or unhalogenated arylalkenyl groups, —NR'$_2$, —SR', —OR', —OSiR'$_3$ or —PR'$_2$ radicals in which R' is one of a halogen atom, a $C_1$-$C_{10}$ alkyl group, or a $C_6$-$C_{10}$ aryl group; or two or more adjacent radicals $R^5$ to $R^7$ together with the atoms connecting them can form one or more rings;

$R^{13}$ is selected from

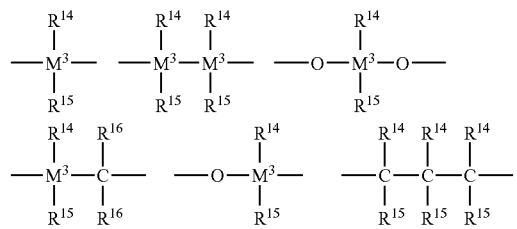

—B($R^{14}$)—, —Al($R^{14}$)—, —Ge—, —Sn—, —O—, —S—, —SO—, —SO$_2$—, —N($R^{14}$)—, —CO—, —P($R^{14}$)— —P(O)—($R^{14}$)—, —B(N$R^{14}R^{15}$)— and —B[N(Si$R^{14}R^{15}R^{16}$)$_2$]—;

$R^{14}$, $R^{15}$ and $R^{16}$ are each independently selected from hydrogen, halogen, $C_1$-$C_{20}$ alkyl groups, $C_6$-$C_{30}$ aryl groups, $C_1$-$C_{20}$ alkoxy groups, $C_2$-$C_{20}$ alkenyl groups, $C_7$-$C_{40}$ arylalkyl groups, $C_8$-$C_{40}$ arylalkenyl groups and $C_7$-$C_{40}$ alkylaryl groups, or $R^{14}$ and $R^{15}$, together with the atom(s) connecting them, form a ring; and $M^3$ is selected from carbon, silicon, germanium and tin.

Alternatively, $R^{13}$ is represented by the formula:

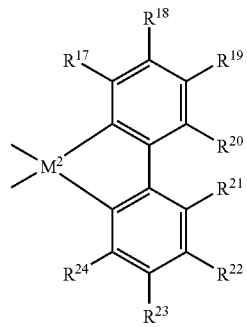

wherein $R^{17}$ to $R^{24}$ are as defined for $R^1$ and $R^2$, or two or more adjacent radicals $R^{17}$ to $R^{24}$, including $R^{20}$ and $R^{21}$, together with the atoms connecting them form one or more rings; $M^2$ is carbon, silicon, germanium, or tin; and $R^8$, $R^9$, $R^{10}$ $R^{11}$ and $R^{12}$ can be identical or different and have the meanings stated for $R^3$ to $R^7$.

Preferred catalyst compounds useful in this invention include those listed at page 29, paragraph [00100] to page 66, paragraph [00102] of WO 2004/026921.

In another embodiment scandium catalyst complexes may also be used in the processes of this invention with or without an activator, see U.S. Pat. No. 6,403,773 for more information on these complexes.

In a particularly preferred embodiment bisamide catalyst compounds are used in the processes of this invention. Bisamide catalyst compounds are defined to be bidentate bisamide catalyst compounds, pyridine bisamide catalyst compounds, and amine bisamide catalyst compounds.

Preferred bidentate bisamide catalyst compounds are those represented by the following formula:

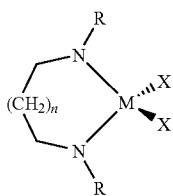

M is Ti, Zr, or Hf;

R are the same or different alkyl, aryl, substituted alkyl, or substituted aryl radicals. X are the same or different alkyl, aryl, or halide radicals. Substituted alkyls and aryls can be alkyl-, aryl-, and halo-substituted; and n is 1, 2, 3, 4 or 5. When X is a halide, the bisamide catalyst compound is typically first chemically modified to transform X into an abstractable ligand. This can be done by alkylation, for example.

Pyridine bisamide catalyst compounds are also useful in the processes of this invention. Preferred pyridine bisamide catalyst compounds are those compounds represented by the formula:

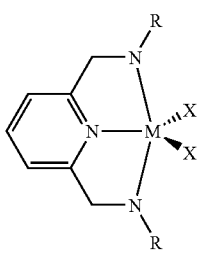

M is Ti, Zr, or Hf;

R are the same or different alkyl, aryl, substituted alkyl, or substituted aryl radicals. X are the same or different alkyl, aryl, or halide radicals. Substituted alkyls and aryls can be alkyl-, aryl-, and halo-substituted. When X is a halide, the pyridine bisamide catalyst compound is typically first chemically modified to transform X into an abstractable ligand. This can be done by alkylation, for example.

Amine bisamide catalyst compounds are also useful in the processes of this invention. Preferred amine bisamide catalyst compounds are those represented by the formula:

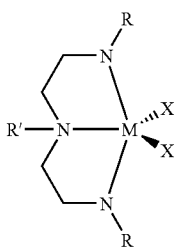

M is Ti, Zr, or Hf;

R and R' are the same or different alkyl, aryl, substituted alkyl, or substituted aryl radicals;

X are the same or different alkyl, aryl, or halide radicals. Substituted alkyl and aryls can be alkyl-, aryl-, and halosubstituted. When X is a halide, the amine bisamide catalyst compound must first be chemically modified to transform X into an abstractable ligand. This can be done by alkylation, for example.

Additional catalyst compounds that may be used herein include bisimide catalyst compounds represented by the formula:

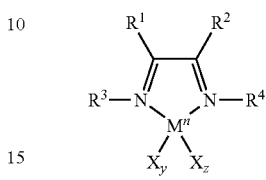

where M is a group 8, 9, 10, metal, preferably a group 10 metal, preferably Pd, Pt or Ni;

n is the oxidation state of M and may be 2, 3, or 4;

each X is independently a halogen or a substituted or unsubstituted hydrocarbyl group, a substituted or unsubstituted hydrocarboxy group, or a substituted or unsubstituted heteroatom containing group;

y is 0 or 1;

z is 0 or 1, where n=y+z+2;

$R^1$ is a heteroatom, a substituted $C_1$ to $C_{50}$ hydrocarbyl group or an unsubstituted $C_1$ to $C_{50}$ hydrocarbyl group;

$R^2$ is a heteroatom, a substituted $C_1$ to $C_{50}$ hydrocarbyl group or an unsubstituted $C_1$ to $C_{50}$ hydrocarbyl group;

$R^3$ is a heteroatom, a substituted $C_1$ to $C_{50}$ hydrocarbyl group or an unsubstituted $C_1$ to $C_{50}$ hydrocarbyl group, preferably a phenyl group;

$R^4$ is a heteroatom, a substituted $C_1$ to $C_{50}$ hydrocarbyl group or an unsubstituted $C_1$ to $C_{50}$ hydrocarbyl group, preferably a phenyl group, where any adjacent R groups may form fused ring systems.

Mixtures

In a preferred embodiment the processes of this invention may be used with two or more catalyst compounds at the same time or in series. In particular two different catalyst compounds can be activated with the same or different activators and introduced into the polymerization system at the same or different times.

As mentioned above, invention process can employ mixtures of catalyst compounds to select the properties that are desired from the polymer. Mixed catalyst systems can be employed in invention processes to alter or select desired physical or molecular properties. For example, mixed catalyst systems can control the molecular weight distribution of isotactic polypropylene when used with the invention processes or for the invention polymers. Mixed-catalyst systems can be used with the invention polymerization processes to tailor the composition distribution of copolymers with high catalyst productivity. These systems can also, optionally, be used with diene incorporation to facilitate long chain branching using mixed catalyst systems and high levels of vinyl terminated polymers. In preferred embodiments two or more of the above catalysts compounds can be used together.

In another embodiment preferred catalyst combinations include any two or more of those catalyst compounds listed at page 70, paragraph [00116] to page 72, line 5 of WO 2004/026921.

In a preferred embodiment if this invention, the catalyst compound comprises one or more of:

μ-dimethyl silylbis(-2-methyl,4-phenylindenyl)zirconium dichloride,
μ-dimethyl silylbis(-2-methyl,4-phenylindenyl)zirconium dimethyl,
1,1'-bis(4-triethylsilylphenyl)methylene-(cyclopentadienyl)(2,7-di-tertiary-butyl-9-fluorenyl)hafnium dichloride,
1,1'-bis(4-triethylsilylphenyl)methylene-(cyclopentadienyl)(2,7-di-tertiary-butyl-9-fluorenyl)hafnium dimethyl,
dimethylsilyl(tetramethylcyclopentadienyl)(dodecylamido)titanium dimethyl,
dimethylsilyl(tetramethylcyclopentadienyl)(dodecylamido)titanium dichloride,
1,1'-bis(4-triethylsilylphenyl)methylene-(cyclopentadienyl)(2,7-di-tertiary-butyl-9-fluorenyl)hafnium dichloride,
1,1'-bis(4-triethylsilylphenyl)methylene-(cyclopentadienyl)(2,7-di-tertiary-butyl-9-fluorenyl)hafnium dimethyl,
dimethylsilylbis(indenyl)hafnium dichloride,
dimethylsilylbis(indenyl)hafnium dimethyl,
dimethylsilyl bis(2-methylindenyl)zirconium dichloride,
dimethylsilyl bis(2-methylindenyl)zirconium dimethyl,
dimethylsilyl bis(2-methylfluorenyl)zirconium dichloride,
dimethylsilyl bis(2-methylfluorenyl)zirconium dimethyl,
dimethylsilyl bis(2-methyl-5,7-propylindenyl)zirconium dichloride,
dimethylsilyl bis(2-methyl-5,7-propylindenyl)zirconium dimethyl,
dimethylsilyl bis(2-methyl-5-phenylindenyl)zirconium dichloride,
dimethylsilyl bis(2-methyl-5-phenylindenyl)zirconium dimethyl,
dimethylsilyl bis(2-ethyl-5-phenylindenyl)zirconium dichloride,
dimethylsilyl bis(2-ethyl-5-phenylindenyl)zirconium dimethyl,
dimethylsilyl bis(2-methyl-5-biphenylindenyl)zirconium dichloride, and
dimethylsilyl bis(2-methyl-5-biphenylindenyl)zirconium dichloride dimethyl.

In another preferred embodiment if this invention, the catalyst compound comprises two or more of:
μ-dimethyl silylbis(-2-methyl,4-phenylindenyl)zirconium dichloride,
μ-dimethyl silylbis(-2-methyl,4-phenylindenyl)zirconium dimethyl,
1,1'-bis(4-triethylsilylphenyl)methylene-(cyclopentadienyl)(2,7-di-tertiary-butyl-9-fluorenyl)hafnium dichloride,
1,1'-bis(4-triethylsilylphenyl)methylene-(cyclopentadienyl)(2,7-di-tertiary-butyl-9-fluorenyl)hafnium dimethyl,
dimethylsilyl(tetramethylcyclopentadienyl)(dodecylamido)titanium dimethyl, dimethylsilyl(tetramethylcyclopentadienyl)(dodecylamido)titanium dichloride,
1,1'-bis(4-triethylsilylphenyl)methylene-(cyclopentadienyl)(2,7-di-tertiary-butyl-9-fluorenyl)hafnium dichloride,
1,1'-bis(4-triethylsilylphenyl)methylene-(cyclopentadienyl)(2,7-di-tertiary-butyl-9-fluorenyl)hafnium dimethyl,
dimethylsilylbis(indenyl)hafnium dichloride,
dimethylsilylbis(indenyl)hafnium dimethyl,
dimethylsilyl bis(2-methylindenyl)zirconium dichloride,
dimethylsilyl bis(2-methylindenyl)zirconium dimethyl,
dimethylsilyl bis(2-methylfluorenyl)zirconium dichloride,
dimethylsilyl bis(2-methylfluorenyl) zirconium dimethyl,
dimethylsilyl bis(2-methyl-5,7-propylindenyl)zirconium dichloride,
dimethylsilyl bis(2-methyl-5,7-propylindenyl)zirconium dimethyl,
dimethylsilyl bis(2-methyl-5-phenylindenyl)zirconium dichloride,
dimethylsilyl bis(2-methyl-5-phenylindenyl)zirconium dimethyl,
dimethylsilyl bis(2-ethyl-5-phenylindenyl)zirconium dichloride,
dimethylsilyl bis(2-ethyl-5-phenylindenyl)zirconium dimethyl,
dimethylsilyl bis(2-methyl-5-biphenylindenyl)zirconium dichloride, and
dimethylsilyl bis(2-methyl-5-biphenylindenyl)zirconium dichloride dimethyl.

In a particularly preferred embodiment if this invention, the catalyst compound comprises:
1) dimethylsilyl(tetramethylcyclopentadienyl)(dodecylamido)titanium dichloride and μ-dimethyl silylbis(-2-methyl,4-phenylindenyl)zirconium dichloride;
2) dimethylsilyl(tetramethylcyclopentadienyl)(dodecylamido)titanium methyl and μ-dimethyl silylbis(-2-methyl,4-phenylindenyl)zirconium dimethyl;
3) 1,1'-bis(4-triethylsilylphenyl)methylene-(cyclopentadienyl)(2,7-di-tertiary-butyl-9-fluorenyl)hafnium dichloride and 1-dimethyl silylbis(-2-methyl,4-phenylindenyl)zirconium dichloride; or
4) 1,1'-bis(4-triethylsilylphenyl)methylene-(cyclopentadienyl)(2,7-di-tertiary-butyl-9-fluorenyl)hafnium dimethyl and μ-dimethyl silylbis(-2-methyl,4-phenylindenyl)zirconium dimethyl.

Activators and Activation Methods for Catalyst Compounds

The catalyst compounds described herein are combined with activators for use in the processes of this invention. An activator is defined as any combination of reagents that increases the rate at which a metal complex polymerizes unsaturated monomers, such as olefins. An activator may also affect the molecular weight, degree of branching, comonomer content, or other properties of the polymer.

A. Alumoxane and Aluminum Alkyl Activators

In one embodiment, one or more alumoxanes are utilized as an activator in the processes of the invention. Alumoxanes, sometimes called aluminoxanes in the art, are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide. Mixtures of different alumoxanes and modified alumoxanes may also be used. For further descriptions, see U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 B1, EP 0 516 476 A, EP 0 594 218A1 and WO 94/10180.

When the activator is an alumoxane (modified or unmodified), some embodiments select the maximum amount of activator at a 5000-fold molar excess Al1M over the catalyst compound (per metal catalytic site). The minimum activator-to-catalyst-compound is typically a 1:1 molar ratio.

Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publications WO 94/10180 and WO 99/15534, all of which are herein fully incorporated by reference. It may be preferable to use a visually clear methylalumoxane. A cloudy or gelled alumoxane can be filtered to produce a clear solution or clear alumoxane can be decanted from the cloudy solution. Another preferred alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

Aluminum alkyl or organoaluminum compounds which may be utilized as activators (or scavengers) include trimethylaluminum, triethylaluminum, triisobutylaluminum, tri-n-hexylaluminum, tri-n-octylaluminum and the like.

B. Ionizing Activators

It is within the scope of this invention to use an ionizing or stoichiometric activator, neutral or ionic, such as tri(n-butyl) ammonium tetrakis (pentafluorophenyl)boron, a trisperfluorophenyl boron metalloid precursor or a trisperfluoronaphtyl boron metalloid precursor, polyhalogenated heteroborane anions (WO 98/43983), boric acid (U.S. Pat. No. 5,942,459) or combination thereof as an activator in the processes of this invention. It is also within the scope of this invention to use neutral or ionic activators alone or in combination with alumoxane or modified alumoxane activators.

Examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups. Most preferably, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

Preferred activators include a cation and an anion component, and may be represented by the following formula:

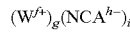

$W^{f+}$ is a cation component having the charge f+
$NCA^{h-}$ is a non-coordinating anion having the charge h−
f is an integer from 1 to 3.
h is an integer from 1 to 3.
g and h are constrained by the relationship: $(g) \times (f) = (h) \times (i)$.

The cation component, ($W^{f+}$) may include Bronsted acids such as protons or protonated Lewis bases or reducible Lewis acids capable of protonating or abstracting a moiety, such as an alkyl or aryl, from an analogous metallocene or Group 15 containing transition metal catalyst compound, resulting in a cationic transition metal species.

In a preferred embodiment, the activators include a cation and an anion component, and may be represented by the following formula:

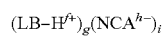

wherein LB is a neutral Lewis base;
H is hydrogen;
$NCA^{h-}$ is a non-coordinating anion having the charge h−
f is an integer from 1 to 3,
h is an integer from 1 to 3,
g and h are constrained by the relationship: $(g) \times (f) = (h) \times (i)$ The activating cation ($W^{f+}$) may be a Bronsted acid, ($LB-H^{f+}$), capable of donating a proton to the transition metal catalyst compound resulting in a transition metal cation, including ammoniums, oxoniums, phosphoniums, silyliums and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers and tetrahydrothiophene and mixtures thereof.

The activating cation ($W^{f+}$) may also be an abstracting moiety such as silver, carboniums, tropylium, carbeniums, ferroceniums and mixtures, preferably carboniums and ferroceniums. Most preferably ($W^{f+}$) is triphenyl carbonium or N,N-dimethylanilinium.

The anion component ($NCA^{h-}$) includes those having the formula $[T^{j+}Q_k]^{h-}$ wherein j is an integer from 1 to 3; k is an integer from 2 to 6; k−j=h; T is an element selected from Group 13 or 15 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable ($NCA^{h-}$)$_i$ also include diboron compounds as disclosed in U.S. Pat. No. 5,447,895, which is fully incorporated herein by reference.

Additional suitable anions are known in the art and will be suitable for use with the catalysts of the invention. See in particular, U.S. Pat. No. 5,278,119 and the review articles by S. H. Strauss, "The Search for Larger and More Weakly Coordinating Anions", Chem. Rev., 93, 927-942 (1993) and C. A. Reed, "Carboranes: A New Class of Weakly Coordinating Anions for Strong Electrophiles, Oxidants and Superacids", Acc. Chem. Res., 31, 133-139 (1998). Illustrative, but not limiting examples of boron compounds which may be used as an activating cocatalyst in the preparation of the improved catalysts of this invention are tri-substituted ammonium salts such as:

trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium)tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl-(2,4,6-trimethylanilinium)tetrakis(pentafluorophenyl)borate,
trimethylammonium tetrakis-(2,3,4,6-tetrafluorophenylborate,
triethylammonium tetrakis-(2,3,4,6-tetrafluorophenyl)borate,
tripropylammonium tetrakis-(2,3,4,6-tetrafluorophenyl)borate,
tri(n-butyl)ammonium tetrakis-(2,3,4,6-tetrafluoro-phenyl)borate,
dimethyl(t-butyl)ammonium tetrakis-(2,3,4,6-tetrafluorophenyl)borate,
N,N-dimethylanilinium tetrakis-(2,3,4,6-tetrafluorophenyl)borate,
N,N-diethylanilinium tetrakis-(2,3,4,6-tetrafluoro-phenyl)borate, and
N,N-dimethyl-(2,4,6-trimethylanilinium)tetrakis-(2,3,4,6-tetrafluorophenyl)borate;
dialkyl ammonium salts such as: di-(i-propyl)ammonium tetrakis(pentafluorophenyl)borate, and dicyclohexylammonium
tetrakis(pentafluorophenyl)borate; and tri-substituted phosphonium salts such as:
triphenylphosphonium tetrakis(pentafluorophenyl)borate, tri(o-tolyl)phosphonium
tetrakis(pentafluorophenyl)borate, and tri(2,6-dimethylphenyl)phosphonium tetrakis(pentafluorophenyl)borate.

Most preferably, the ionic stoichiometric activator is N,N-dimethylanilinium tetra(perfluorophenyl)borate and/or triphenylcarbenium tetra(perfluorophenyl)borate.

In one embodiment, an activation method using ionizing ionic compounds not containing an active proton but capable of producing an analogous metallocene catalyst cation and their non-coordinating anion are also contemplated, and are described in EP-A-0 426 637, EP-A-0 573 403 and U.S. Pat. No. 5,387,568, which are all herein incorporated by reference.

The term "non-coordinating anion" (NCA) means an anion which either does not coordinate to said cation or which is only weakly coordinated to said cation thereby remaining sufficiently labile to be displaced by a neutral Lewis base. "Compatible" non-coordinating anions are those which are not degraded to neutrality when the initially formed complex decomposes. Non-coordinating anions useful in accordance with this invention are those that are compatible, stabilize the metal cation in the sense of balancing its ionic charge, yet retain sufficient lability to permit displacement by an ethylenically or acetylenically unsaturated monomer during polymerization. These types of cocatalysts sometimes use tri-isobutyl aluminum or tri-octyl aluminum as a scavenger.

Invention process also can employ cocatalyst compounds or activator compounds that are initially neutral Lewis acids but form a cationic metal complex and a noncoordinating anion, or a zwitterionic complex upon reaction with the invention compounds. For example, tris(pentafluorophenyl) boron or aluminum act to abstract a hydrocarbyl or hydride ligand to yield an invention cationic metal complex and stabilizing noncoordinating anion, see EP-A-0 427 697 and EP-A-0 520 732 for illustrations of analogous Group-4 metallocene compounds. Also, see the methods and compounds of EP-A-0 495 375. For formation of zwitterionic complexes using analogous Group 4 compounds, see U.S. Pat. Nos. 5,624,878; 5,486,632; and 5,527,929.

Additional neutral Lewis-acids are known in the art and are suitable for abstracting formal anionic ligands. See in particular the review article by E. Y.-X. Chen and T. J. Marks, "Cocatalysts for Metal-Catalyzed Olefin Polymerization: Activators, Activation Processes, and Structure-Activity Relationships", *Chem. Rev.*, 100, 1391-1434 (2000).

When the catalyst compound does not contain at least one hydride or hydrocarbyl ligand but does contain at least one functional group ligand, such as chloride, amido or alkoxy ligands, and the functional group ligands are not capable of discrete ionizing abstraction with the ionizing, anion precursor compounds, these functional group ligands can be converted via known alkylation reactions with organometallic compounds such as lithium or aluminum hydrides or alkyls, alkylalumoxanes, Grignard reagents, etc. See EP-A-0 500 944, EP-A1-0 570 982 and EP-A1-0 612 768 for analogous processes describing the reaction of alkyl aluminum compounds with analogous dihalide substituted metallocene compounds prior to or with the addition of activating noncoordinating anion precursor compounds.

When the cations of noncoordinating anion precursors are Bronsted acids such as protons or protonated Lewis bases (excluding water), or reducible Lewis acids such as ferrocenium or silver cations, or alkali or alkaline earth metal cations such as those of sodium, magnesium or lithium, the catalyst-compound-to-activator molar ratio may be any ratio. Combinations of the described activator compounds may also be used for activation. For example, tris(perfluorophenyl)boron can be used with methylalumoxane.

C. Non-Ionizing Activators

Activators are typically strong Lewis-acids which may play either the role of ionizing or non-ionizing activator. Activators previously described as ionizing activators may also be used as non-ionizing activators.

Abstraction of formal neutral ligands may be achieved with Lewis acids that display an affinity for the formal neutral ligands. These Lewis acids are typically unsaturated or weakly coordinated. Examples of non-ionizing activators include $R^{10}(R^{11})_3$, where $R^{10}$ is a group 13 element and $R^{11}$ is a hydrogen, a hydrocarbyl, a substituted hydrocarbyl, or a functional group. Typically, $R^{11}$ is an arene or a perfluorinated arene. Non-ionizing activators also include weakly coordinated transition metal compounds such as low valent olefin complexes.

Non-limiting examples of non-ionizing activators include $BMe_3$, $BEt_3$, $B(iBu)_3$, $BPh_3$, $B(C_6F_5)_3$, $AlMe_3$, $AlEt_3$, $Al(iBu)_3$, $AlPh_3$, $B(C_6F_5)_3$, alumoxane, CuCl, Ni(1,5-cyclooctadiene)$_2$.

Additional neutral Lewis-acids are known in the art and will be suitable for abstracting formal neutral ligands. See in particular the review article by E. Y.-X. Chen and T. J. Marks, "Cocatalysts for Metal-Catalyzed Olefin Polymerization:

Activators, Activation Processes, and Structure-Activity Relationships", *Chem. Rev.*, 100, 1391-1434 (2000).

Preferred non-ionizing activators include $R^{10}(R^{11})_3$, where $R^{10}$ is a group 13 element and $R^{11}$ is a hydrogen, a hydrocarbyl, a substituted hydrocarbyl, or a functional group. Typically, $R^{11}$ is an arene or a perfluorinated arene.

More preferred non-ionizing activators include $B(R^{12})_3$, where $R^{12}$ is a an arene or a perfluorinated arene. Even more preferred non-ionizing activators include $B(C_6H_5)_3$ and $B(C_6F_5)_3$. A particularly preferred non-ionizing activator is $B(C_6F_5)_3$. More preferred activators are ionizing and non-ionizing activators based on perfluoroaryl borane and perfluoroaryl borates such as $PhNMe_2H^+B(C_6F_5)_4^-$, $(C_6H_5)_3C^+B(C_6F_5)_4^{-31}$, and $B(C_6F_5)_3$.

Additional preferred activators that may be used with the catalysts compounds disclosed herein include those described in WO 03/064433A1, which is incorporated by reference herein.

In general the catalyst compound(s) and the activator are combined in ratios of about 1000:1 to about 0.5:1. In a preferred embodiment the catalyst compounds and the activator are combined in a ratio of about 300:1 to about 1:1, preferably about 150:1 to about 1:1, for boranes, borates, aluminates, etc. the ratio is preferably about 1:1 to about 10:1 and for alkyl aluminum compounds (such as diethylaluminum chloride combined with water) the ratio is preferably about 0.5:1 to about 10:1.

In a preferred embodiment the ratio of the first catalyst to the second or additional catalyst is 5:95 to 95:5, preferably 25:75 to 75:25, even more preferably 40:60 to 60:40.

In general the combined catalyst compounds and the activator are combined in ratios of about 1:10,000 to about 1:1, in other embodiments the combined catalyst compounds and the activator are combined in ratios of 1:1 to 100:1. When alumoxane or aluminum alkyl activators are used, the combined catalyst compound-to-activator molar ratio is from 1:5000 to 10:1, alternatively from 1:1000 to 10:1; alternatively, 1:500 to 2:1; or 1:300 to 1:1. When ionizing activators are used, the combined catalyst compound-to-activator molar ratio is from 10:1 to 1:10; 5:1 to 1:5; 2:1 to 1:2; or 1.2:1 to 1:1. Multiple activators may be used, including using mixtures of alumoxanes or aluminum alkyls with ionizing activators.

Ideally, the fluorocarbon is inert to the polymerization reaction. By "inert to the polymerization reaction" is meant that the fluorocarbon does not react chemically with the, monomers, catalyst system or the catalyst system components. (This is not to say that the physical environment provided by an FC's does not influence the polymerization reactions, in fact, it may do so to some extent, such as affecting activity rates. However, it is meant to say that the FC's are not present as part of the catalyst system.)

Supports

In another embodiment the catalyst compositions of this invention include a support material or carrier. For example, the one or more catalyst components and/or one or more activators may be deposited on, contacted with, vaporized with, bonded to, or incorporated within, adsorbed or absorbed in, or on, one or more supports or carriers.

The support material is any of the conventional support materials. Preferably the supported material is a porous support material, for example, talc, inorganic oxides and inorganic chlorides. Other support materials include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

The preferred support materials are inorganic oxides that include those Group 2, 3, 4, 5, 13 or 14 metal oxides. The preferred supports include silica, which may or may not be dehydrated, fumed silica, alumina (WO 99/60033), silica-alumina and mixtures thereof. Other useful supports include magnesia, titania, zirconia, magnesium chloride (U.S. Pat. No. 5,965,477), montmorillonite (European Patent EP-B10 511 665), phyllosilicate, zeolites, talc, clays (U.S. Pat. No. 6,034,187) and the like. Also, combinations of these support materials may be used, for example, silica-chromium, silica-alumina, silica-titania and the like. Additional support materials may include those porous acrylic polymers described in EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference.

It is preferred that the support material, most preferably an inorganic oxide, has a surface area in the range of from about 10 to about 700 m$^2$/g, pore volume in the range of from about 0 to about 4.0 cc/g and average particle size in the range of from about 0.02 to about 50 μm. More preferably, the surface area of the support material is in the range of from about 50 to about 500 m$^2$/g, pore volume of from about 0 to about 3.5 cc/g and average particle size of from about 0.02 to about 20 μm. Most preferably the surface area of the support material is in the range is from about 100 to about 400 m$^2$/g, pore volume from about 0 to about 3.0 cc/g and average particle size is from about 0.02 to about 10 μm.

Non-porous supports may also be used as supports in the processes described herein. For example, in a preferred embodiment the nonporous, fumed silica supports described in U.S. Pat. No. 6,590,055 can be used in the practice of this invention. Additional useful activators for use in the processes of this invention include clays that have been treated with acids (such as $H_2SO_4$) and then combined with metal alkyls (such as triethylaluminum) as described in U.S. Pat. No. 6,531,552 and EP 1 160 261 A1, which is incorporated by reference herein.

Preferred activators include that may also be supports include ion-exchange layered silicate having an acid site of at most −8.2 pKa, the amount of the acid site is equivalent to at least 0.05 mmol/g of 2,6-dimethylpyridine consumed for neutralization. Preferred examples include chemically treated smectite group silicates, acid-treated smectite group silicates. Additional preferred examples of the ion-exchange layered silicate useful in this invention include layered silicates having a 1:1 type structure or a 2:1 type structure as described in "Clay Minerals (Nendo Kobutsu Gaku)" written by Haruo Shiramizu (published by Asakura Shoten in 1995).

Examples of an ion-exchange layered silicate comprising the 1:1 layer as the main constituting layer include kaolin group silicates such as dickite, nacrite, kaolinite, metahalloysite, halloysite or the like, and serpentine group silicates such as chrysotile, lizaldite, antigorite or the like. Additional preferred examples of the ion-exchange layered silicate useful in this invention include ion-exchange layered silicates comprising the 2:2 layer as the main constituting layer include smectite group silicates such as montmorillonite, beidellite, nontronite, saponite, hectorite, stephensite or the like, vermiculite group silicates such as vermiculite or the like, mica group silicates such as mica, illite, sericite, glauconite or the like, and attapulgite, sepiolite, palygorskite, bentonite, pyrophyllite, talc, chlorites and the like. The clays are contacted with an acid, a salt, an alkali, an oxidizing agent, a reducing agent or a treating agent containing a compound intercalatable between layers of an ion-exchange layered silicate. The intercalation means to introduce other material between layers of a layered material, and the material to be introduced is called as a guest compound. Among these treatments, acid treatment or salt treatment is particularly preferable. The treated clay may then be contacted with an activator compound, such as TEAL, and the catalyst compound to polymerize olefins.

In another embodiment the polymerization system comprises less than 5 weight % polar species, preferably less than 4 weight %, more preferably less than 3 weight %, more preferably less than 2 weight %, more preferably less than 1 weight %, more preferably less than 1000 ppm, more preferably less than 750 ppm, more preferably less than 500 ppm, more preferably less than 250 ppm, more preferably less than 100 ppm, more preferably less than 50 ppm, more preferably less than 10 ppm. *Polar* species include oxygen containing compounds (except for alumoxanes) such as alcohols, oxygen, ketones, aldehydes, acids, esters and ethers.

In another embodiment the polymerization system comprises less than 5 weight % trimethylaluminum and/or triethylaluminum, preferably less than 4 weight %, more preferably less than 3 weight %, more preferably less than 2 weight %, more preferably less than 1 weight %, more preferably less than 1000 ppm, more preferably less than 750 ppm, more preferably less than 500 ppm, more preferably less than 250 ppm, more preferably less than 100 ppm, more preferably less than 50 ppm, more preferably less than 10 ppm.

In another preferred embodiment the polymerization system comprises methylalumoxane and less than 5 weight % trimethylaluminum and or triethylaluminum, preferably less than 4 weight %, more preferably less than 3 weight %, more preferably less than 2 weight %, more preferably less than 1 weight %, more preferably less than 1000 ppm, more preferably less than 750 ppm, more preferably less than 500 ppm, more preferably less than 250 ppm, more preferably less than 100 ppm, more preferably less than 50 ppm, more preferably less than 10 ppm.

In addition to finely divided supports, invention processes can use fumed silica supports in which the support particle diameter can range from 200 angstroms to 1500 angstroms, small enough to form a colloid with reaction media.

Polymerization Process

In a preferred embodiment any of the polymerization process described herein are a continuous process. By continuous is meant a system that operates (or is intended to operate) without interruption or cessation. For example a continuous process to produce a polymer would be one in which the reactants are continuously introduced into one or more reactors and polymer product is continually withdrawn. This invention relates to processes to polymerize olefins comprising contacting one or more olefins with a catalyst compound and an activator at in a supercritical polymerization medium comprising fluorinated hydrocarbon in a reactor. One or more reactors in series or in parallel may be used in the present invention. Catalyst compounds and activators may be delivered as a solution or slurry, either separately to the reactor, activated in-line just prior to the reactor, or preactivated and pumped as an activated solution or slurry to the reactor. A preferred operation is two solutions activated in-line. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst components can be added to the first reactor in the series. The catalyst component may also be added to both reactors, with one component being added to first reaction and another component to other reactors.

Invention methods also cover polymerization of olefins (such as ethylene and or propylene) in high-pressure reactors where, preferably, the reactor is substantially unreactive with the polymerization reaction components and is able to withstand the high pressures and temperatures that occur during the polymerization reaction. Such reactors are known as high-pressure reactors for purposes of this disclosure. Withstanding these high pressures and temperatures will allow the reactor to maintain the monomers under supercritical conditions. Suitable reaction vessels include those known in the art to maintain supercritical or other high-pressure ethylene polymerization reactions. Suitable reactors are selected from autoclave, tubular, and autoclave/tubular reactors, among others.

The polymerization processes described herein operate well in autoclave and tubular reactors. Typically, autoclave reactors have length-to-diameter ratios of 1:1 to 20:1 and are fitted with a high-speed (up to 1500 RPM) multiblade stirrer. Autoclave pressures are typically greater than 6 MPa with a maximum of typically less than 260 MPa. When the autoclave has a low length-to-diameter ratio (such as less than 4) the monomers are typically injected at only one position. But injection at two or more positions in the autoclave is also possible. For instance, in reactors where the length-to-diameter ratio is around 4-20, the reactor can contain up to six different injection positions. Additionally, in the larger autoclaves, one or more lateral fixing devices support the high-speed stirrer. These fixing devices can also divide the autoclave into two or more zones. Mixing blades on the stirrer can differ from zone to zone to allow for plug flow or back mixing, largely independently, in the separate zones. Two or more autoclaves with one or more zones can connect in series to tailor polymer structure.

Tubular reactors are also well suited for use in this invention, preferably tubular reactors capable of operating up to about 350 MPa. Preferred tubular reactors are fitted with external cooling and one or more injection points along the (tubular) reaction zone. As in autoclaves, these injection points serve as entry points for monomers (such as propylene), one or more comonomer, catalyst, or mixtures of these. In tubular reactors, external cooling allows for increased monomer conversion relative to an autoclave, where the low surface-to-volume ratio hinders any significant heat removal. Tubular reactors have a special outlet valve that can send a pressure shockwave backward along the tube. The shockwave helps dislodge any polymer residue that has formed on reactor walls during operation. Another way of addressing wall deposits is to fabricate the tube with smooth, unpolished internal surfaces. Preferred tubular reactors can operate at pressures up to 360 MPa and preferably have lengths of 100-2000 meters and internal diameters usually less than 10 cm.

Reactor trains that pair autoclaves with tubular reactors can also serve in invention processes. In such instances, the autoclave typically precedes the tubular reactor. Such systems may have injection of additional catalyst and/or feed components at several points in the autoclave and more particularly along the tube length.

In both autoclaves and tubular reactors, at injection, feeds are preferably room temperature or below to provide maximum polymer production within the limits of maximum operating temperature. In autoclave operation, a preheater operates at startup, but not after the reaction reaches steady state if the first mixing zone has some back-mixing characteristics. In tubular reactors, the first section of double-jacketed tubing is heated rather than cooled and is operated continuously since a tubular reactor is by nature plug flow. In both multizone autoclaves and tubular reactors, catalyst can not only be injected at the inlet, but also optionally at one or more points along the reactor. The catalyst feeds injected at the inlet and other injection points can be the same or different in terms of content, density, concentration, etc. Choosing different catalyst feeds allows polymer design tailoring. At the reactor outlet valve, the pressure drops to levels below that which critical phase separation occurs. Therefore, the downstream vessel contains a polymer-rich phase and a polymer-lean phase. Typically, conditions in this vessel remain supercritical and temperature remains above the polymer product's crystallization temperature. The autoclave or tubular reactor effluent is depressurized on entering the high pressure separator (HPS). In polymerizations based on propylene alternative choices are open to the design relative to classic high pressure polyethylene process technology.

At the reactor outlet valve the pressure drops to begin the separation of polymer and unreacted monomer, co-monomers, propane, etc. The temperature in this vessel will be maintained above the polymer product's crystallization point but the pressure may be below the critical point. The pressure need only be high enough that the propylene can be condensed against standard cooling water. The liquid recycle stream can then be recycled to the reactor with a liquid pumping system instead of the hyper-compressors required for polyethylene units. The relatively low pressure in this separator will reduce the monomer concentration in the liquid polymer phase which will result in a much lower polymerization rate. This polymerization rate may be low enough to operate this system without adding a catalyst poison or "killer". If a catalyst killer is required (e.g., to prevent reactions in the high pressure recycle) then provision must be made to remove any potential catalyst poisons from the recycled monomer stream e.g. by the use of fixed bed adsorbents or by scavenging with an aluminum alkyl. (Alternatively, the HPS may be operated over propylene's critical pressure but within the propylene/polypropylene two phase region. This is an economically preferred method if polypropylene is to be produced with a revamped HPPE plant. The recycled HPS overhead is cooled and dewaxed before being returned to the suction of the secondary compressor, which is typical of HPPE plant operation.)

The polymer from this intermediate or high pressure vessel will then go through another pressure reduction step to a low pressure separator. The temperature of this vessel will be maintained above the polymer melting point so that the polymer from this vessel can be fed as a liquid directly to an extruder or static mixer. The pressure in this vessel will be kept low by using a compressor to recover the unreacted monomers, etc to the condenser and pumping system referenced above.

In addition to autoclave reactors, tubular reactors, or reactors combining these, loop-type reactors function as well. In this reactor type, monomer enters and polymer exits continuously at different points along the loop, while an in-line pump continuously circulates the contents (reaction liquid). The feed/product takeoff rates control total average residence time. A cooling jacket removes reaction heat from the loop. Industrially a loop reactor is typically not operated at the high pressures encountered in autoclaves and tubes.

Commercial low pressure loop reactors have diameters of 16 to 24 inches (41 to 61 cm) and lengths of 100 to 200+ meters. Operation in a single supercritical polypropylene in propylene solution phase is preferably at pressures of greater than 25 to 30 MPa. At these pressures smaller diameter thicker wall loop tubing is necessary resulting in potential difficulties in pump around efficiency and maximum allowable reactor capacity.

In addition to autoclave reactors, tubular reactors, or a combination of these reactors, loop-type reactors are useful in this invention. In this reactor type, monomer enters and polymer exits continuously at different points along the loop, while an in-line pump continuously circulates the contents (reaction liquid). The feed/product takeoff rates control total average residence time. A cooling jacket removes reaction heat from the loop. U.S. Pat. No. 6,355,741 discusses a reactor with at least two loops that is useful in the practice of this invention provided that one or both operate at the supercritical conditions. U.S. Pat. No. 5,326,835 describes a process said to produce polymer in a bimodal fashion. This process's first reactor stage is a loop reactor in which polymerization occurs in an inert, low-boiling hydrocarbon. After the loop reactor, the reaction medium transits into a gas-phase reactor where gas-phase polymerization occurs. Since two very different environments create the polymer, it shows a bimodal molecular weight distribution. This two stage procedure can be modified to work with the procedure of the instant application.

PCT publication WO 19/14766 describes a process useful herein comprising the steps of (a) continuously feeding olefinic monomer and a catalyst system, with a metallocene component and a cocatalyst component, to the reactor; (b) continuously polymerizing that monomer in a polymerization zone reactor under elevated pressure in the presence of a fluorinated hydrocarbon; (c) continuously removing the polymer/monomer mixture from the reactor; (d) continuously separating monomer from molten polymer; (e) reducing pressure to form a monomer-rich and a polymer-rich phase; and (f) separating monomer from the reactor. The polymerization zoning technique described in the above process can be practiced using the instant invention's process conditions and fluorinated hydrocarbons. That is, the above process is suitable for use with this invention provided at least one polymerization zone operates as supercritical.

In general, feed inlet temperatures are generally at or below room temperature to provide cooling to the exothermic reaction in the reactor operating above the crystallization temperature of the polymer product. For a predominantly propylene containing feed with a catalyst producing significant polymer isotacticity the reactor temperature will be above 145° C.

The processes described herein may have residence times as short as 0.5 seconds and as long as several hours. In preferred embodiments the residence times are from 1 second to 30 minutes, preferably 5 seconds to 10 minutes, more preferably from 10 seconds to 5 minutes, more preferably from 10 seconds to 3 minutes. In some embodiments the residence time can be selected from 10, 30, 45, 50, 60, 120, and 150 seconds. Maximum residence times can be selected from 200, 300, 400, 500, or 600 seconds. In general, invention processes choose residence times of from 30-600 seconds; more particularly 45-400 or 60-300 seconds. In general, invention processes choose residence times of from 30 sec to 1 hour; more particularly 30 sec to 30 minutes; 45-400, or 60-300 sec. In another embodiment the polymerization of propylene the residence times are up to 5 minutes.

In some embodiments, invention processes produce polymer at a rate of 560-10000 LB/w-Ft². More particularly, production rates can range from 560-2000 or 600-1500.

In reactors with multiple injection points for catalyst and feed there exists the possibility to tailor the polymer design. Use of more than one catalyst having different molecular weight and structural capabilities allows a wide variety of product compositions (e.g. bimodal, linear mixed with long chain branched). Likewise, the various olefins will have differing reactivity ratios for a given catalyst so a plug flow type operation will allow compositional tapering if for instance no feeds are injected down the reactor or compensation of the tapering if the more reactive monomer is injected preferentially along the tube. A single zone ideal back mixed autoclave reactor will not allow tapering of polymer composition but the use of multiple catalysts is still applicable. Operation of two such autoclaves in series or parallel can allow the use of tailoring by altering the composition of fresh feed to the second reactor.

Typically, the reactor effluent is depressurized to an intermediate pressure significantly below the cloud point pressure but nevertheless supercritical for that composition. This allows separation of a polymer rich phase for further purification and a propylene rich phase for recycle compression back to the reactor. This separation is carried out in a vessel known as a high pressure separator (HPS). Since this vessel also has a significant residence time, the catalyst activity is killed by addition of a polar species such as water, alcohol or sodium/calcium stearate. The choice and quantity of killing agent will depend on the requirements for clean up of the recycle propylene and comonomers as well as the product properties, if the killing agent has low volatility. Alternatively the intermediate separation can be done at pressures well below the critical point so that the monomer concentration and therefore reactivity in the high pressure separator is relatively low. The relatively small amount of continued polymerization in this vessel may not be a problem so addition of catalyst deactivating compounds as is done in PE processes may be avoided presuming that no undesired reactions occur in the high or intermediate pressure recycle system. If no killing compounds are added then the killer removal step can be eliminated.

With respect to propylene polymerization, propylene is available commercially at two levels of purity—polymer grade at 99.5% and chemical grade at about 93 to 95%. The choice of feed will set the level of purge required from the recycle to avoid over dilution of the feed by inert propane. The presence of propane in the reactor and HPS will raise the pressure of the cloud point curve for a given temperature but will decrease the polymerization efficiency due to a decrease in propylene (and other olefin) concentrations in the reactor. The elevation of cloud point pressure due to propane will widen the operating window of the HPS. In copolymerizations of propylene with limited amounts of ethylene, a similar effect in raising the cloud point pressure will be noted due to the presence of low levels of ethylene in the HPS.

Polymer Products

The polymers produced by invention processes may be in any structures including block, linear, radial, star, branched, and combinations of these. Preferred polymers produced herein may have an $M_n$ (number-average molecular weight) value from 300 to 1,000,000, or between from 700 to 300,000. For low weight molecular weight applications, such as those copolymers useful in lubricating and fuel oil compositions, an $M_n$ of 300 to 20,000 is contemplated, or less than or equal to 10,000. For higher molecular weight applications the polymers produced herein preferably have Mw's of 50,000 to 1,000,000, preferably 70,000 to 500,000. Additionally, preferred polymers produced herein may have a molecular weight distribution (MWD) in the range of $\geq 1$, or $\geq 1.5$ or $<8$ or $\leq 6$, or $\leq 4$.

The polymers produced are preferably homo- and co-polymers of ethylene and or propylene and include linear low density polyethylene, elastomers, plastomers, high-density polyethylenes, medium density polyethylenes, low density polyethylenes, polypropylene and polypropylene copolymers. Polymers, typically ethylene based copolymers, have a density of from 0.80 g/cc to 0.97 g/cc, preferably from 0.86 g/cc to 0.97 g/cc; density being measured in accordance with ASTM-D-1238.

The polymers of this invention may be blended and/or coextruded with any other polymer. Non-limiting examples of other polymers include linear low density polyethylenes, elastomers, plastomers, high pressure low density polyethylene, high density polyethylenes, isotactic polypropylene, ethylene propylene copolymers and the like.

The polymers produced by the process of the invention can be used in a wide variety of products and end-use applications including forming operations as film, sheet, and fiber extrusion and co-extrusion as well as blow molding, injection molding, roto-molding. The polymers produced by the process of the invention can also be used in films including blown or cast films formed by coextrusion or by lamination useful as shrink film, cling film, stretch film, sealing film, oriented films, and the like. The polymers produced by the process of the invention can also be used in fibers, such as spunbonded and melt blown fibers, fabrics, such as nonwoven fabrics, and molded articles. More particularly, these articles include, for example, cast films, oriented films, injection molded articles, blow molded articles, foamed articles, foam laminates and thermoformed articles.

PROPHETIC EXAMPLES

Propylene polymerizations are run in a 100 ml autoclave reactor designed for a maximum pressure of 300 MPa and a maximum temperature of 300° C. having a stirrer, magnetic drive, an electric heater (controlled by a thermocouple), and a rupture disc. Pressure will be measured with a pressure transducer (PIRC) and manometer and temperature will be measured by a thermocouple inside the autoclave. Propylene is prepared in two tanks having a volume of 6 L each and is fed with the fluorinated hydrocarbon by a membrane pump through the axis of the stirrer into the autoclave. The pressure in the propylene/fluorinated hydrocarbon feed line is measured and indicated by a manometer. Hexane is metered through a feed line from a tank having a volume of 3 L using a second membrane pump. A predetermined amount of activated of catalyst solution is placed in a syringe type pump. As the catalyst solution is dispensed from the syringe, it is diluted with hexane and or fluorinated hydrocarbon before entering the reactor. The pressure in the catalyst feed line is measured with a manometer. The reaction is allowed to proceed for a set amount of time once the desired pressure and temperature have been established. The reaction is terminated by releasing the pressure, venting to air and collecting the polymer produced.

In order to remove impurities, propylene (or other monomers) are treated with tri-iso-butylaluminum (TIBA) as a scavenger for about a day. For this purpose a mixture of hexane and TIBA is metered into a tank. Afterwards propylene is taken from a bomb and condensed into the tank. For further purification the propylene is evaporated into a second tank and condensed. The metallocene catalyst is dissolved in a mixture of toluene and methyl alumoxane (MAO). This solution is stored under 2.5 MPa nitrogen. For each test 10 ml of the solution is placed in a syringe-type pump to be metered continuously into the autoclave.

The catalyst feed is further diluted with hexane and or fluorinated hydrocarbon. Before treatment, the hexane itself is also treated with TIBA under 2.5 MPa nitrogen. The mixture of catalyst, hexane, dluorocarbon and a negligible quantity of TIBA is fed by pump to adjust a ratio of 90 mol propylene to 10 mol hexane and a pre-set catalyst concentration in the feed. The conversion is determined from the total quantity of polymer that is collected during the residence time and the amount of propylene added to the reaction. The typical feed temperature at start-up is 150-168° C. Once polymerization is commenced, the autoclave temperature rises to a stable polymerization temperature of from 150 to 250° C. Table A reports conditions for homopolymerizations or propylene using (μ-dimethylsilyl)bis(2-methyl-4-phenylindenyl)zirconium dichloride as the catalyst in an amount of 0.85 moles/liter and methyl alumoxane as cocatalyst present at an Al to Zr ratio of 100:1. The fluorocarbons are present at 100 weight %, based upon the weight of the fluorocarbon and any other solvent or diluent present, or at 50 weight %, with the other 50 weight % being hexane.

TABLE A

Polymerization conditions for propylene homopolymerization

| Run | Reaction Pressure (MPa) | Temp (° C.) | FC (100 wt %) | Run | Reaction Pressure (MPa) | Temp (° C.) | (100 wt %) |
|---|---|---|---|---|---|---|---|
| 1 | 5 | 92 | 1 | 29 | 100 | 175 | 4 |
| 2 | 5 | 95 | 2 | 30 | 100 | 200 | 5 |
| 3 | 5 | 100 | 3 | 31 | 100 | 250 | 1 |
| 4 | 5 | 125 | 4 | 32 | 100 | 300 | 2 |
| 5 | 5 | 175 | 5 | 33 | 120 | 92 | 3 |
| 6 | 5 | 200 | 6 | 34 | 120 | 95 | 4 |
| 7 | 5 | 250 | 2 | 35 | 120 | 100 | 5 |
| 8 | 5 | 300 | 3 | 36 | 120 | 125 | 1 |
| 9 | 10 | 92 | 4 | 37 | 150 | 175 | 2 |
| 10 | 10 | 95 | 5 | 38 | 150 | 200 | 3 |
| 11 | 10 | 100 | 1 | 39 | 150 | 250 | 4 |
| 12 | 10 | 125 | 2 | 40 | 150 | 300 | 5 |
| 13 | 25 | 175 | 3 | 41 | 180 | 92 | 6 |
| 14 | 25 | 200 | 4 | 42 | 180 | 95 | 2 |
| 15 | 25 | 250 | 5 | 43 | 180 | 100 | 3 |
| 16 | 25 | 300 | 1 | 44 | 180 | 125 | 4 |
| 17 | 50 | 92 | 2 | 45 | 220 | 175 | 5 |
| 18 | 50 | 95 | 3 | 46 | 220 | 200 | 1 |
| 19 | 50 | 100 | 4 | 47 | 220 | 250 | 2 |
| 20 | 50 | 125 | 6 | 48 | 220 | 300 | 3 |
| 21 | 50 | 175 | 1 | 49 | 250 | 92 | 4 |
| 22 | 60 | 200 | 2 | 50 | 250 | 95 | 5 |
| 23 | 60 | 250 | 3 | 51 | 250 | 100 | 1 |
| 24 | 60 | 300 | 4 | 52 | 250 | 125 | 2 |
| 25 | 80 | 92 | 5 | 53 | 250 | 175 | 3 |
| 26 | 80 | 95 | 1 | 54 | 300 | 200 | 4 |
| 27 | 80 | 100 | 2 | 55 | 300 | 250 | 5 |
| 28 | 80 | 125 | 6 | 56 | 180 | 200 | 3 |

FC-1 is 1,1,1,3,3,3-hexafluoropropane
FC-2 is 1,1,1,2-tetrafluoroethane
FC-3 is ,1,1,3,3-pentafluoropropane
FC-4 is 1,1,1,3,3-pentafluorobutane
FC-5 is octafluorocyclobutane
FC-6 is 2,3-dihydrodecafluoropentane The above polymerizations in Table A are repeated with ethylene instead of propylene.

The above polymerizations in Table A are repeated with propylene and hexene fed into the reactor together in a weight ratio of 15:1.

The above polymerizations in Table A are repeated with propylene and ethylene fed into the reactor together in a weight ratio of 15:1.

The above polymerizations in Table A are repeated with propylene and ethylene fed into the reactor together in a weight ratio of 1:15.

The above polymerizations in Table A are repeated with ethylene and butene fed into the reactor together in a weight ratio of 15:1.

All of the above polymerizations are repeated with dimethylaniliniumtetrakis(pentafluorophenyl)borate present in a boron to zirconium ratio of 5:1.

All cited patents, test procedures, priority documents, and other cited documents are fully incorporated by reference to the extent that this material is consistent with this specification and for all jurisdictions in which such incorporation is permitted. All documents described herein are incorporated by reference herein, including any priority documents and/or testing procedures. Likewise, the term "comprising" is considered synonymous with the term "including" for purposes of Australian law.

The invention claimed is:

1. A process to polymerize hydrocarbon olefins comprising contacting, under supercritical conditions, hydrocarbon olefin monomers with a Group 3-10 transition metal catalyst compound, an activator, optional comonomer, and optional hydrocarbon diluent or hydrocarbon solvent, in the presence of a fluorinated hydrocarbon absent fluoromonomers to provide a polymer comprising at least 75 mole % of hydrocarbon monomers, where the hydrocarbon olefin monomers are present in the polymerization system at 40 wt % or more, where the polymerization system is defined to be monomer(s) plus comonomer(s) plus fluorinated hydrocarbon(s), plus hydrocarbon solvent(s)/diluent(s) plus polymer product present.

2. The process of claim 1 wherein the fluorinated hydrocarbon is present at from 3 to 99 weight %, based upon the weight of the fluorinated hydrocarbon, the monomers and any solvent or diluent present.

3. The process of claim 1 wherein the polymerization medium comprises a hydrocarbon solvent or hydrocarbon diluent.

4. The process of claim 3 wherein the hydrocarbon solvent or diluent is selected from the group consisting of propane, n-butane, isobutane, mixed butanes, n-pentane, isopentane, neopentane, n-hexane, isohexane, mixed hexanes, cyclohexane, octane and desulphurized light virgin naphtha.

5. The process of claim 1, wherein the fluorinated hydrocarbon comprises a perfluorinated hydrocarbon.

6. The process of claim 1 wherein the fluorinated hydrocarbon comprises a hydrofluorocarbon.

7. The process of claim 1 wherein the fluorinated hydrocarbon is represented by the formula: $C_xH_yF_z$ wherein x is an integer from 1 to 40, y is an integer greater than or equal to 0 and z is an integer and is at least one.

8. The process of claim 1 wherein the fluorinated hydrocarbon is selected from the group consisting of fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3- tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; and 1,1,2,2,3,3,4-heptafluorocyclobutane.

9. The process of claim 1 wherein the fluorinated hydrocarbon is selected from the group consisting of difluoromethane, trifluoromethane, 1,1-difluoroethane, 1,1,1-trifluoroethane, fluoromethane, 1,1,1,3,3,3-hexafluoropropane, 1,1,1,2-tetrafluoroethane, 1,1,1,3,3-pentafluoropropane, 1,1,1,3,3-pentafluorobutane, octafluorocyclobutane, and 2,3-dihydrodecafluoropentane.

10. The process of claim 1 wherein the monomer comprises ethylene present at 50 weight % or more, based upon the weight of the monomers and comonomers present.

11. The process of claim 1 wherein the monomer comprises propylene present at 50 weight % or more, based upon the weight of the monomers and comonomers present.

12. The process of claim 1 wherein the supercritical conditions comprise a temperature above the cloud point temperature of the polymerization system, where the polymerization system consists of the monomers, any comonomer present, any diluent or solvent present, and the polymer product.

13. The process of claim 1 wherein the supercritical conditions comprise a pressure above the cloud point pressure of the polymerization system, where the polymerization system consists of the monomers, any comonomer present, any diluent or solvent present, and the polymer product.

14. The process of claim 8 wherein the supercritical conditions comprise a pressure no lower than 10 MPa below the cloud point pressure of the polymerization system.

15. The process of claim 1 wherein the supercritical conditions comprise a temperature above 95° C. and a pressure above 5 MPa.

16. The process of claim 10 wherein the temperature is between 100 and 350° C.

17. The process of claim 1 wherein the catalyst comprises a metallocene catalyst compound, a bisamide catalyst compound and/or a bisimide catalyst compound, and the supercritical conditions comprise a temperature above the cloud point temperature of the polymerization system and a pressure no lower than 10 MPa below the cloud point pressure of the polymerization system and less than 150 MPa, where the polymerization system comprises the monomers, any comonomer present, fluorinated hydrocarbon, any diluent or solvent present, and the polymer product, and where the olefin monomers are present in the polymerization system at 40 weight % or more.

18. The process of claim 17 wherein the catalyst compound comprises a metallocene catalyst compound and the pressure of the polymerization system is less than 125 MPa.

19. The process of claim 17 where the temperature is between 140 to 180° C.

20. The process of claim 17 wherein the catalyst compound comprises a metallocene catalyst compound, the pressure of the polymerization system is less than 100 MPa, and the temperature is between 140 to 180° C.

21. The process of claim 17 wherein the pressure of the polymerization system is above the cloud point pressure of the polymerization system.

22. The process of claim 17 wherein the pressure of the polymerization system is between 15 and 140 MPa.

23. The process of claim 17 wherein the pressure of the polymerization system is between 15 and 50 MPa.

24. The process of claim 17 wherein hydrocarbon solvent and or hydrocarbon diluent is present in the polymerization system at 1 to 25 wt %.

25. The process of claim 17 wherein hydrocarbon solvent and or hydrocarbon diluent is present in the polymerization system at 1 to 10 wt %.

26. The process of claim 17 wherein the olefin monomers are present in the polymerization system at 55 wt % or more.

27. The process of claim 17 wherein the olefin monomers are present in the polymerization system at 75 wt % or more.

28. The process of claim 17 wherein the olefin monomer comprises propylene.

29. The process of claim 28 wherein comonomer is present at 1 to 45 mole %.

30. The process of claim 17 wherein the polymerization medium of the monomer, comonomers, fluorinated hydrocarbon, solvents and diluents comprises from 55-100 wt % propylene monomer; from 1 to 45 wt % of a comonomer mixture comprising at least one comonomer selected from ethylene, butene, hexene, octene, 4-methylpentene-1, dicyclopentadiene, or norbornene.

31. The process of claim 17 wherein the polymerization medium of the monomer, comonomers, fluorinated hydrocarbon, solvents and diluents comprises from 55-100 wt % ethylene monomer; from 1 to 45 wt % of a comonomer mixture comprising at least one comonomer selected from propylene, butene, hexene, octene, 4-methylpentene-1, dicyclopentadiene, or norbornene.

32. The process of claim 17 wherein the catalyst compound comprises a bisamide compound.

33. The process of claim 17 wherein the catalyst compound comprises a bisimide catalyst compound.

34. The process of claim 17 wherein the catalyst compound is represented by the formula:

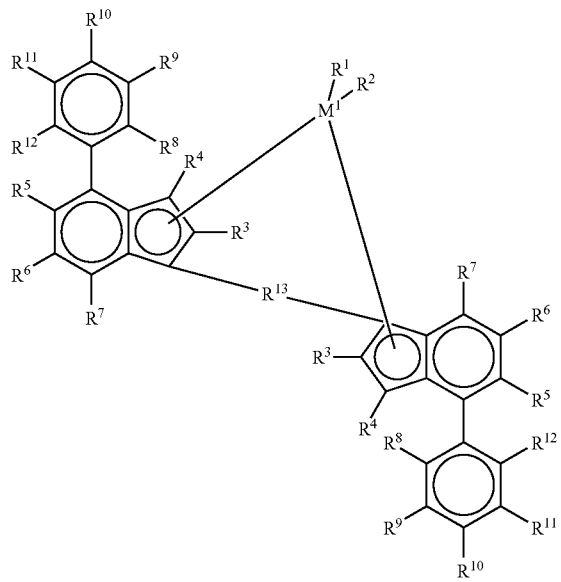

where $M^1$ is selected from titanium, zirconium, hafnium, vanadium, niobium, tantalum, chromium, molybdenum, or tungsten;

$R^1$ and $R^2$ are identical or different and are selected from hydrogen atoms, $C_1$-$C_{10}$ alkyl groups, $C_1$-$C_{10}$ alkoxy groups, $C_6$-$C_{10}$ aryl groups, $C_6$-$C_{10}$ aryloxy groups, $C_2$-$C_{10}$ alkenyl groups, $C_2$-$C_{40}$ alkenyl groups, $C_7$-$C_{40}$ arylalkyl groups, $C_7$-$C_{40}$ alkylaryl groups, $C_8$-$C_{40}$ arylalkenyl groups, OH groups or halogen atoms; or conjugated dienes that are optionally substituted with one or more hydrocarbyl, tri(hydrocarbyl)silyl groups or hydrocarbyl tri(hydrocarbyl)silylhydrocarbyl groups;

$R^3$-$R^{12}$ are the same or different and are selected from hydrogen atoms, halogen atoms, $C_1$-$C_{10}$ halogenated or unhalogenated alkyl groups, $C_6$-$C_{10}$ halogenated or unhalogenated aryl groups, $C_2$-$C_{10}$ halogenated or unhalogenated alkenyl groups, $C_7$-$C_{40}$ halogenated or unhalogenated arylalkyl groups, $C_7$-$C_{40}$ halogenated or unhalogenated alkylaryl groups, $C_8$-$C_{40}$ halogenated or unhalogenated arylalkenyl groups, —NR$'_2$, —SR', —OR', —OSiR$'_3$ or —PR$'_2$ radicals in which R' is one of a halogen atom, a $C_1$-$C_{10}$ alkyl group, or a $C_6$-$C_{10}$ aryl group; or two or more adjacent radicals $R^5$ to $R^7$ together with the atoms connecting them can form one or more rings;

$R^{13}$ is selected from

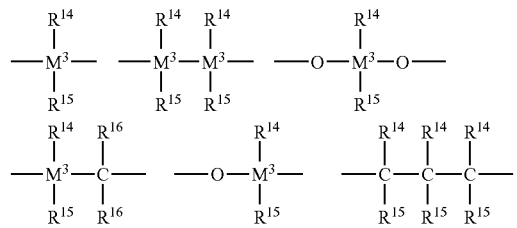

—B($R^{14}$)—, —Al($R^{14}$)—, —Ge—, —Sn—, —O—, —S—, —SO—, —SO$_2$—, —N($R^{14}$)—, —CO—, —P($R^{14}$)— —P(O)($R^{14}$)—, —B(NR$^{14}$R$^{15}$)— and —B[N(SiR$^{14}$R$^{15}$R$^{16}$)$_2$]—, $R^{14}$, $R^{15}$ and $R^{16}$ are each independently selected from hydrogen, halogen, $C_1$-$C_{20}$ alkyl groups, $C_6$-$C_{30}$ aryl groups, $C_1$-$C_{20}$ alkoxy groups, $C_2$-$C_{20}$ alkenyl groups, $C_7$-$C_{40}$ arylalkyl groups, $C_8$-$C_{40}$ arylalkenyl groups and $C_7$-$C_{40}$ alkylaryl groups, or $R^{14}$ and $R^{15}$, together with the atom(s) connecting them, form a ring; and $M^3$ is selected from carbon, silicon, germanium and tin, or $R^{13}$ is represented by the formula:

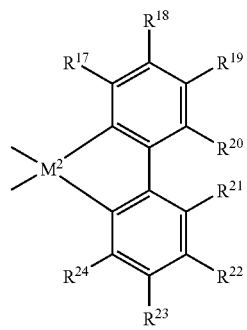

wherein $R^{17}$ to $R^{24}$ are as defined for $R^1$ and $R^2$, or two or more adjacent radicals $R^{17}$ to $R^{24}$, including $R^{20}$ and $R^{21}$, together with the atoms connecting them form one or more rings; $M^2$ is carbon, silicon, germanium, or tin.

35. The process of claim 17 wherein the catalyst compound comprises one or more of:

μ-dimethyl silylbis(-2-methyl,4-phenylindenyl)zirconium dichloride,

μ-dimethyl silylbis(-2-methyl,4-phenylindenyl)zirconium dimethyl, 1,1'-bis(4-triethylsilylphenyl)methylene-(cyclopentadienyl)(2,7-di-tertiary-butyl-9-fluorenyl)hafnium dichloride, 1,1'-bis(4-triethylsilylphenyl)methylene-(cyclopentadienyl)(2,7-di-tertiary-butyl-9-fluorenyl)hafnium dimethyl, dimethylsilyl(tetramethylcyclopentadienyl)(dodecylamido)titanium dimethyl, dimethylsilyl(tetramethylcyclopentadienyl)(dodecylamido)titanium dichloride, 1,1'-bis(4-triethylsilylphenyl)methylene-(cyclopentadienyl)(2,7-di-tertiary-butyl-9-fluorenyl)hafnium dichloride, 1,1'-bis(4-triethylsilylphenyl)methylene-(cyclopentadienyl)(2,7-di-tertiary-butyl-9-fluorenyl)hafnium dimethyl,
dimethylsilylbis(indenyl)hafnium dichloride,
dimethylsilylbis(indenyl)hafnium dimethyl,
dimethylsilyl bis(2-methylindenyl)zirconium dichloride,
dimethylsilyl bis(2-methylindenyl)zirconium dimethyl,
dimethylsilyl bis(2-methylfluorenyl)zirconium dichloride,
dimethylsilyl bis(2-methylfluorenyl)zirconium dimethyl,
dimethylsilyl bis(2-methyl-5,7-propylindenyl)zirconium dichloride,
dimethylsilyl bis(2-methyl-5,7-propylindenyl)zirconium dimethyl,
dimethylsilyl bis(2-methyl-5-phenylindenyl)zirconium dichloride,
dimethylsilyl bis(2-methyl-5-phenylindenyl)zirconium dimethyl,
dimethylsilyl bis(2-ethyl-5-phenylindenyl)zirconium dichloride,
dimethylsilyl bis(2-ethyl-5-phenylindenyl)zirconium dimethyl,
dimethylsilyl bis(2-methyl-5-biphenylindenyl)zirconium dichloride, and
dimethylsilyl bis(2-methyl-5-biphenylindenyl)zirconium dichloride dimethyl.

36. The process of claim 17 wherein the catalyst compound comprises two or more of:
μ-dimethyl silylbis(-2-methyl,4-phenylindenyl)zirconium dichloride,
μ-dimethyl silylbis(-2-methyl,4-phenylindenyl)zirconium dimethyl,
1,1'-bis(4-triethylsilylphenyl)methylene-(cyclopentadienyl)(2,7-di-tertiary-butyl-9-fluorenyl)hafnium dichloride,
1,1'-bis(4-triethylsilylphenyl)methylene-(cyclopentadienyl)(2,7-di-tertiary-butyl-9-fluorenyl)hafnium dimethyl,
dimethylsilyl(tetramethylcyclopentadienyl)(dodecylamido)titanium dimethyl,
dimethylsilyl(tetramethylcyclopentadienyl)(dodecylamido)titanium dichloride,
1,1'-bis(4-triethylsilylphenyl)methylene-(cyclopentadienyl)(2,7-di-tertiary-butyl-9-fluorenyl)hafnium dichloride,
1,1'-bis(4-triethylsilylphenyl)methylene-(cyclopentadienyl)(2,7-di-tertiary-butyl-9-fluorenyl)hafnium dimethyl,
dimethylsilylbis(indenyl)hafnium dichloride,
dimethylsilylbis(indenyl)hafnium dimethyl,
dimethylsilyl bis(2-methylindenyl)zirconium dichloride,
dimethylsilyl bis(2-methylindenyl)zirconium dimethyl,
dimethylsilyl bis(2-methylfluorenyl)zirconium dichloride,
dimethylsilyl bis(2-methylfluorenyl)zirconium dimethyl,
dimethylsilyl bis(2-methyl-5,7-propylindenyl)zirconium dichloride,
dimethylsilyl bis(2-methyl-5,7-propylindenyl)zirconium dimethyl,
dimethylsilyl bis(2-methyl-5-phenylindenyl)zirconium dichloride,
dimethylsilyl bis(2-methyl-5-phenylindenyl)zirconium dimethyl,
dimethylsilyl bis(2-ethyl-5-phenylindenyl)zirconium dichloride,
dimethylsilyl bis(2-ethyl-5-phenylindenyl)zirconium dimethyl,
dimethylsilyl bis(2-methyl-5-biphenylindenyl)zirconium dichloride, and
dimethylsilyl bis(2-methyl-5-biphenylindenyl)zirconium dichloride dimethyl.

37. The process of claim 17 wherein the catalyst compound comprises:
1) dimethylsilyl(tetramethylcyclopentadienyl)(dodecylamido)titanium dichloride and μ-dimethyl silylbis(-2-methyl,4-phenylindenyl)zirconium dichloride;
2) dimethylsilyl(tetramethylcyclopentadienyl)(dodecylamido)titanium methyl and μ-dimethyl silylbis(-2-methyl,4-phenylindenyl)zirconium dimethyl;
3) 1,1'-bis(4-triethylsilylphenyl)methylene-(cyclopentadienyl)(2,7-di-tertiary-butyl-9-fluorenyl)hafnium dichloride and μ-dimethyl silylbis(-2-methyl,4-phenylindenyl) zirconium dichloride; or
4) 1,1'-bis(4-triethylsilylphenyl)methylene-(cyclopentadienyl)(2,7-di-tertiary-butyl-9-fluorenyl)hafnium dimethyl and μ-dimethyl silylbis(-2-methyl,4-phenylindenyl) zirconium dimethyl.

38. The process of claim 1 wherein the activator comprises alumoxane.

39. The process of claim 1 wherein the activator comprises a non-coordinating anion.

40. The process of claim 1 wherein the activator comprises one or more of trimethylammonium tetraphenylborate,
trisperfluorophenyl borate,
trisperfluoronaphtyl borate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium)tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl-(2,4,6-trimethylanilinium)tetrakis(pentafluorophenyl)borate,
trimethylammonium tetrakis-(2,3,4,6-tetrafluorophenylborate,
triethylammonium tetrakis-(2,3,4,6-tetrafluorophenyl)borate,
tripropylammonium tetrakis-(2,3,4,6-tetrafluorophenyl)borate,
tri(n-butyl)ammonium tetrakis-(2,3,4,6-tetrafluoro-phenyl)borate,
dimethyl(t-butyl)ammonium tetrakis-(2,3,4,6-tetrafluorophenyl)borate,
N,N-dimethylanilinium tetrakis-(2,3,4,6-tetrafluorophenyl)borate,
N,N-diethylanilinium tetrakis-(2,3,4,6-tetrafluoro-phenyl)borate,
N,N-dimethyl-(2,4,6-trimethylanilinium)tetrakis-(2,3,4,6-tetrafluorophenyl)borate,
dialkyl ammonium salts such as: di-(i-propyl)ammonium tetrakis(pentafluorophenyl)borate,
dicyclohexylammonium tetrakis(pentafluorophenyl)borate,
triphenylphosphonium tetrakis(pentafluorophenyl)borate, tri(o-tolyl)phosphonium tetrakis(pentafluorophenyl)borate, and tri(2,6-dimethylphenyl)phosphonium tetrakis(pentafluorophenyl)borate.

41. The process of claim 1 wherein the activator comprises N,N-dimethylanilinium tetra(perfluorophenyl)borate and/or triphenylcarbenium tetra(perfluorophenyl)borate.

42. The process of claim 1 wherein the polymerization takes place in a tubular reactor.

43. The process of claim 42 wherein the tubular reactor has a length-to-diameter ratio of 1:1 to 20:1.

44. The process of claim 42 wherein the tubular reactor has a length-to-diameter ratio of 4:1 to 20:1 and the reactor contains up to six different injection positions.

45. The process of claim 42 wherein the tubular reactor has a length of 100-2000 meters and an internal diameter of less than 10 cm.

46. The process of claim 42 wherein the tubular reactor is operated in multiple zones.

47. The process of claim 1 wherein the polymerization takes place in an autoclave reactor.

48. The process of claim 47 wherein the autoclave reactor has a length-to-diameter ratio of 1:1 to 20:1.

49. The process of claim 47 wherein the autoclave reactor has a length-to-diameter ratio of 4:1 to 20:1 and the reactor contains up to six different injection positions.

50. The process of claim 47 wherein the autoclave reactor is operated in multiple zones.

51. The process of claim 47 wherein the process comprises (a) continuously feeding olefin monomers, fluorinated hydrocarbon, catalyst compound, and activator to the autoclave reactor; (b) continuously polymerizing the monomers in a polymerization zone reactor under elevated pressure; (c) continuously removing the polymer/monomer mixture from the reactor; (d) continuously separating monomer from molten polymer; (e) reducing pressure to form a monomer-rich and a polymer-rich phase; and (f) separating monomer from the polymer.

52. The process of claim 1 wherein the polymerization takes place in a loop reactor.

53. The process of claim 52 wherein the loop reactor has a diameter of 41 to 61 cm and a length of 100 to 200 meters.

54. The process of claim 52 wherein the loop reactor is operated at pressures of 25 to 30 MPa.

55. The process of claim 52 where an in-line pump continuously circulates the polymerization system through the loop reactor.

56. The process of claim 52 wherein the process comprises (a) continuously feeding olefin monomers, fluorinated hydrocarbons, catalyst compound, and activator to the loop reactor; (b) continuously polymerizing the monomers in a polymerization zone reactor under elevated pressure; (c) continuously removing the polymer/monomer mixture from the reactor; (d) continuously separating monomer from molten polymer; (e) reducing pressure to form a monomer-rich and a polymer-rich phase; and (f) separating monomer from the polymer.

57. The process of claim 1 wherein the polymerization takes place in multiple reactors.

58. The process of claim 57 wherein the polymerization takes places in a tubular reactor and then an autoclave reactor.

59. The process of claim 57 wherein the polymerization takes places in a tubular reactor and then a loop reactor.

60. The process of claim 1 wherein the residence time is less than 5 minutes.

* * * * *